(12) United States Patent
Badaroglu et al.

(10) Patent No.: US 12,541,340 B2
(45) Date of Patent: Feb. 3, 2026

(54) ACCUMULATOR FOR DIGITAL COMPUTATION-IN-MEMORY ARCHITECTURES

(71) Applicant: QUALCOMM Incorporated, San Diego, CA (US)

(72) Inventors: Mustafa Badaroglu, Flemish Brabant (BE); Zhongze Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1149 days.

(21) Appl. No.: 17/450,815

(22) Filed: Oct. 13, 2021

(65) Prior Publication Data

US 2023/0115373 A1   Apr. 13, 2023

(51) Int. Cl.
*G06F 7/544* (2006.01)
*G06F 15/78* (2006.01)

(52) U.S. Cl.
CPC ........ *G06F 7/5443* (2013.01); *G06F 15/7821* (2013.01); *G06F 2207/481* (2013.01)

(58) Field of Classification Search
CPC .............. G06F 7/607; G06F 2207/481; G06F 15/7821; G06F 1/10; G06F 7/5443; H03K 23/58; H03K 23/62; G11C 7/07; G11C 13/004; G11C 2206/06; G11C 11/413; G11C 11/417; G11C 11/419
See application file for complete search history.

(56) References Cited

U.S. PATENT DOCUMENTS

| | | | | |
|---|---|---|---|---|
| 4,551,846 A * | 11/1985 | Takeda | ................ | H04L 27/1563 375/328 |
| 5,432,830 A * | 7/1995 | Bonnot | .................. | H03K 23/62 377/55 |
| 6,148,313 A * | 11/2000 | Freidin | .................... | G06F 17/15 708/422 |
| 9,158,330 B1 * | 10/2015 | Bar-Lev | .................... | G06F 1/10 |
| 10,825,512 B1 * | 11/2020 | Baker, Jr. | .............. | G11C 11/419 |
| 2004/0046594 A1 * | 3/2004 | Konuk | ..................... | H03K 3/70 327/116 |

(Continued)

OTHER PUBLICATIONS

Badaroglu M., et al., "Low-Energy and Compact Accumulator for Digital Compute-in-Memory," Feb. 22, 2021, 15 Pages.

(Continued)

*Primary Examiner* — Andrew Caldwell
*Assistant Examiner* — Phat N Le
(74) *Attorney, Agent, or Firm* — Patterson + Sheridan LLP

(57) ABSTRACT

Certain aspects provide an apparatus for performing machine learning tasks, and in particular, to computation-in-memory architectures. One aspect provides a method for in-memory computation. The method generally includes: accumulating, via each digital counter of a plurality of digital counters, output signals on a respective column of multiple columns of a memory, wherein a plurality of memory cells are on each of the multiple columns, the plurality of memory cells storing multiple bits representing weights of a neural network, wherein the plurality of memory cells of each of the multiple columns correspond to different word-lines of the memory; adding, via an adder circuit, output signals of the plurality of digital counters; and accumulating, via an accumulator, output signals of the adder circuit.

30 Claims, 14 Drawing Sheets

(56) References Cited

U.S. PATENT DOCUMENTS

| | | | |
|---|---|---|---|
| 2006/0022720 A1* | 2/2006 | Wood | G11C 27/026 |
| | | | 327/94 |
| 2013/0147520 A1* | 6/2013 | Payne | H03K 5/2481 |
| | | | 327/51 |
| 2019/0362787 A1* | 11/2019 | Lu | G11C 13/0069 |
| 2021/0110244 A1 | 4/2021 | Hoang et al. | |
| 2021/0303265 A1 | 9/2021 | Yudanov | |

OTHER PUBLICATIONS

Chih Y-D., et al., "16.4 An 89TOPS/W and 16.3TOPS/mm2 All-Digital SRAM-Based Full-Precision Compute-In Memory Macro in 22nm for Machine-Learning Edge Applications," 2021 IEEE International Solid-State Circuits Conference (ISSCC), Session 16, Computation in Memory, Feb. 17, 2021, 3 pages.

International Search Report and Written Opinion—PCT/US2022/077994—ISA/EPO—Jan. 31, 2023.

* cited by examiner

ACCUMULATOR FOR DIGITAL COMPUTATION-IN-MEMORY ARCHITECTURES

INTRODUCTION

Aspects of the present disclosure relate to performing machine learning tasks, and in particular, to computation-in-memory (CIM) architectures.

Machine learning is generally the process of producing a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data.

As the use of machine learning has proliferated for enabling various machine learning (or artificial intelligence) tasks, the need for more efficient processing of machine learning model data has arisen. In some cases, dedicated hardware, such as machine learning accelerators, may be used to enhance a processing system's capacity to process machine learning model data. However, such hardware demands space and power, which is not always available on the processing device. For example, "edge processing" devices, such as mobile devices, always-on devices, Internet of Things (IoT) devices, and the like, typically have to balance processing capabilities with power and packaging constraints. Further, accelerators may move data across common data busses, which can cause significant power usage and introduce latency into other processes sharing the data bus. Consequently, other aspects of a processing system are being considered for processing machine learning model data.

Memory devices are one example of another aspect of a processing system that may be leveraged for performing processing of machine learning model data through so-called computation-in-memory (CIM) processes. Conventional CIM processes perform computation using analog signals, which may result in inaccuracy of computation results, adversely impacting neural network computations. Accordingly, systems and methods are needed for performing computation-in-memory with increased accuracy.

BRIEF SUMMARY

Certain aspects provide apparatus and techniques for performing machine learning tasks, and in particular, to computation-in-memory architectures.

One aspect provides a circuit for in-memory computation. The circuit generally includes: a memory having multiple columns; a plurality of memory cells on each column of the memory, the plurality of memory cells being configured to store multiple bits representing weights of a neural network, wherein the plurality of memory cells of each of the multiple columns correspond to different word-lines of the memory; a plurality of digital counters, each digital counter of the plurality of digital counters being coupled to a respective column of the multiple columns of the memory; an adder circuit coupled to outputs of the plurality of digital counters; and an accumulator coupled to an output of the adder circuit.

One aspect provides a method for in-memory computation. The method generally includes: accumulating, via each digital counter of a plurality of digital counters, output signals on a respective column of multiple columns of a memory, wherein a plurality of memory cells are on each of the multiple columns, the plurality of memory cells storing multiple bits representing weights of a neural network, wherein the plurality of memory cells of each of the multiple columns correspond to different word-lines of the memory; adding, via an adder circuit, output signals of the plurality of digital counters; and accumulating, via an accumulator, output signals of the adder circuit.

One aspect provides an apparatus for in-memory computation. The apparatus generally includes: means for counting a quantity of logic highs of output signals on a respective column of multiple columns of a memory, wherein a plurality of memory cells are on each of the multiple columns, the plurality of memory cells being configured to store multiple bits representing weights of a neural network, wherein the plurality of memory cells of each of the multiple columns correspond to different word-lines of the memory; means for adding output signals of the plurality of digital counters; and means for accumulating output signals of the means for adding.

Other aspects provide processing systems configured to perform the aforementioned methods, as well as those described herein; non-transitory, computer-readable media comprising instructions that, when executed by one or more processors of a processing system, cause the processing system to perform the aforementioned methods, as well as those described herein; a computer program product embodied on a computer-readable storage medium comprising code for performing the aforementioned methods, as well as those further described herein; and a processing system comprising means for performing the aforementioned methods, as well as those further described herein.

The following description and the related drawings set forth in detail certain illustrative features of one or more aspects.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
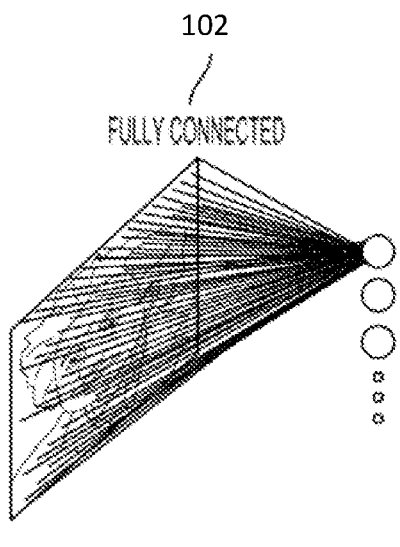
FIGS. 1A-1D depict examples of various types of neural networks, which may be implemented by aspects of the present disclosure.

Aspects of the present disclosure provide apparatuses, methods, processing systems, and computer-readable mediums for performing computation in memory (CIM) to handle data-intensive processing, such as implementing machine learning models. Some aspects provide techniques for performing digital CIM (DCIM) using digital counters, each digital counter accumulating output signals on a respective one of multiple columns of memory. As used herein, an "accumulator" generally refers to circuitry used to accumulate output signals across multiple cycles. An "adder circuit" or "an adder tree" generally refers to digital adders used to add output signals of multiple memory cells (e.g., memory cells across word-lines or columns).

The aspects described herein provide a high-speed and energy-efficient accumulator for digital CIM applications. Word-lines of CIM circuitry may be sequentially activated, and a digital counter may be used to perform accumulation and provide an accumulation result after two or more of the word-lines are sequentially activated. For example, the digital counter may be used to count a quantity of logic highs generated on a column of the memory after multiple computation cycles.

The DCIM circuitry provided herein has an energy consumption per bit that does not scale with the number of activation rows of the memory array, reducing the total energy consumption of the DCIM circuitry as compared to conventional implementations. The aspects described herein also allow for a lowering of the area consumption for the overall CIM system as compared to conventional implementations by reusing an adder tree and accumulator for multiple weight column groups. Moreover, the DCIM circuitry provided herein has a self-timed operation that enables high-speed operation as the digital counters are timed using the signals on respective columns as opposed to using a clock signal. Partial sums from the digital counters may be accumulated on a global accumulator, which is operated at a slower clock, resulting in higher energy efficiency of the CIM system. In some aspects, electromagnetic interference (EMI) is reduced by a self-timed operation and phase-shifting of a local clock within the DCIM circuitry, as described in more detail herein.

CIM-based machine learning (ML)/artificial intelligence (AI) may be used for a wide variety of tasks, including image and audio processing and making wireless communication decisions (e.g., to optimize, or at least increase, throughput and signal quality). Further, CIM may be based on various types of memory architectures, such as dynamic random-access memory (DRAM), static random-access memory (SRAM) (e.g., based on an SRAM cell as in FIG. 4), magnetoresistive random-access memory (MRAM), and resistive random-access memory (ReRAM or RRAM), and may be attached to various types of processing units, including central processing units (CPUs), digital signal processors (DSPs), graphics processing units (GPUs), field-programmable gate arrays (FPGAs), AI accelerators, and others. Generally, CIM may beneficially reduce the "memory wall" problem, which is where the movement of data in and out of memory consumes more power than the computation of the data. Thus, by performing the computation in memory, significant power savings may be realized. This is particularly useful for various types of electronic devices, such as lower power edge processing devices, mobile devices, and the like.

For example, a mobile device may include a memory device configured for storing data and performing computation-in-memory operations (also referred to as "compute-in-memory" operations). The mobile device may be configured to perform an ML/AI operation based on data generated by the mobile device, such as image data generated by a camera sensor of the mobile device. A memory controller unit (MCU) of the mobile device may thus load weights from another on-board memory (e.g., flash or RAM) into a CIM array of the memory device and allocate input feature buffers and output (e.g., output activation) buffers. The processing device may then commence processing of the image data by loading, for example, a layer in the input buffer and processing the layer with weights loaded into the CIM array. This processing may be repeated for each channel of the image data, and the outputs (e.g., output activations) may be stored in the output buffers and then used by the mobile device for an ML/AI task, such as facial recognition.

Brief Background on Neural Networks, Deep Neural Networks, and Deep Learning Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function f (x)=y between any input x and any output y. In other words, deep learning finds the right f to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks (DNNs), may be designed with a variety of connectivity patterns between layers.

FIG. 1A illustrates an example of a fully connected neural network 102. In a fully connected neural network 102, each node in a first layer communicates its output to every node in a second layer, so that each node in the second layer will receive input from every node in the first layer.

Figure 1B:
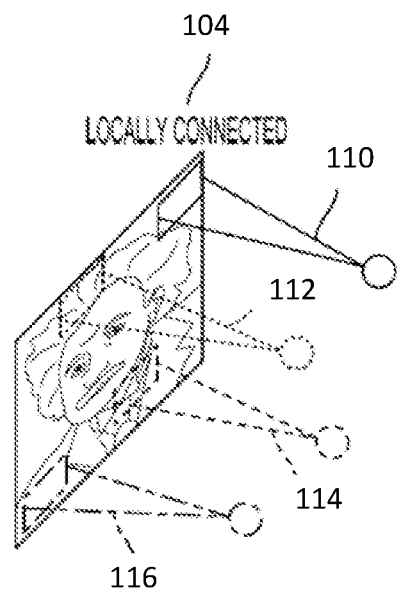

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connection strengths (or weights) that may have different values (e.g., values associated with local areas 110, 112, 114, and 116 of the first layer nodes). The locally connected connectivity pattern may give rise to spatially distinct receptive fields in a higher layer, because the higher layer nodes in a given region may receive inputs that are tuned through training to the properties of a restricted portion of the total input to the network.

Figure 1C:
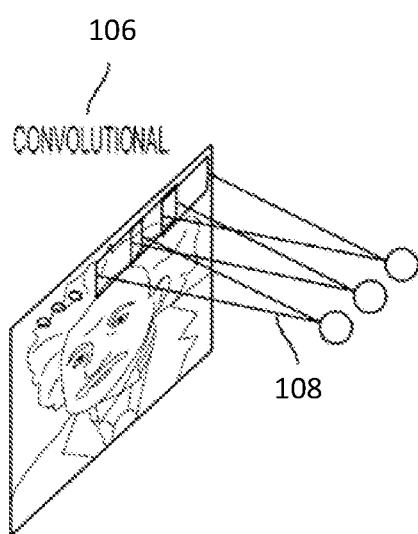

One type of locally connected neural network is a convolutional neural network (CNN). FIG. 1C illustrates an example of a convolutional neural network 106. The convolutional neural network 106 may be configured such that the connection strengths associated with the inputs for each node in the second layer are shared (e.g., for local area 108 overlapping another local area of the first layer nodes). Convolutional neural networks are well suited to problems in which the spatial locations of inputs are meaningful.

One type of convolutional neural network is a deep convolutional network (DCN). Deep convolutional networks are networks of multiple convolutional layers, which may further be configured with, for example, pooling and normalization layers.

Figure 1D:
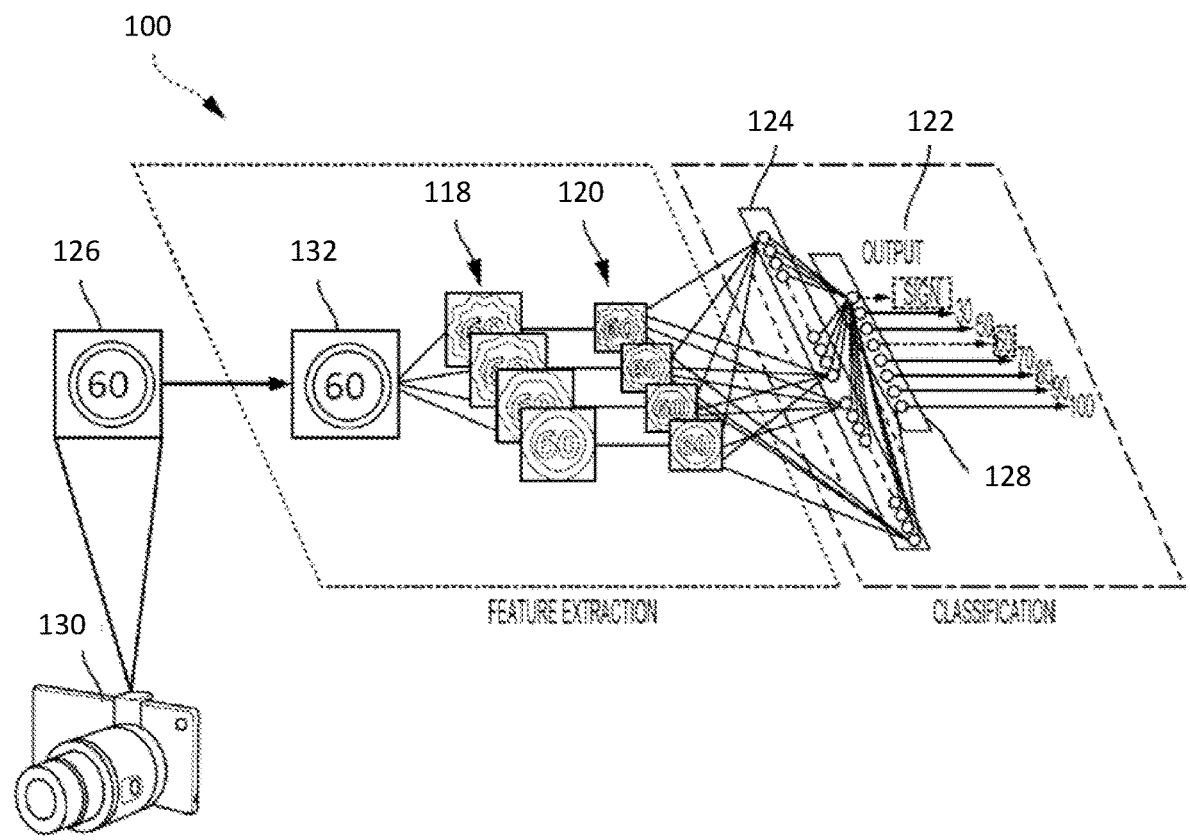

FIG. 1D illustrates an example of a DCN 100 designed to recognize visual features in an image 126 generated by an image-capturing device 130. For example, if the image-capturing device 130 is a camera mounted in or on (or otherwise moving along with) a vehicle, then the DCN 100 may be trained with various supervised learning techniques to identify a traffic sign and even a number on the traffic sign. The DCN 100 may likewise be trained for other tasks, such as identifying lane markings or identifying traffic lights. These are just some example tasks, and many others are possible.

In the example of FIG. 1D, the DCN 100 includes a feature-extraction section and a classification section. Upon receiving the image 126, a convolutional layer 132 applies convolutional kernels (for example, as depicted and described in FIG. 2) to the image 126 to generate a first set of feature maps 118 (or intermediate activations). Generally, a "kernel" or "filter" comprises a multidimensional array of weights designed to emphasize different aspects of an input data channel. In various examples, "kernel" and "filter" may be used interchangeably to refer to sets of weights applied in a convolutional neural network.

The first set of feature maps 118 may then be subsampled by a pooling layer (e.g., a max pooling layer, not shown) to generate a second set of feature maps 120. The pooling layer may reduce the size of the first set of feature maps 118 while maintaining much of the information in order to improve model performance. For example, the second set of feature maps 120 may be downsampled to a 14×14 matrix from a 28×28 matrix by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is provided to a fully connected layer 124, which in turn generates an output feature vector 128. Each feature of the output feature vector 128 may include a number that corresponds to a possible feature of the image 126, such as "sign," "60," and "100." In some cases, a softmax function (not shown) may convert the numbers in the output feature vector 128 to a probability. In such cases, an output 122 of the DCN 100 is a probability of the image 126 including one or more features.

A softmax function (not shown) may convert the individual elements of the output feature vector 128 into a probability in order that an output 122 of DCN 100 is one or more probabilities of the image 126 including one or more features, such as a sign with the number "60" thereon, as in image 126. Thus, in the present example, the probabilities in the output 122 for "sign" and "60" should be higher than the probabilities of the other elements of the output 122, such as "30," "40," "50," "70," "80," "90," and "100."

Before training the DCN 100, the output 122 produced by the DCN 100 may be incorrect. Thus, an error may be calculated between the output 122 and a target output known a priori. For example, here the target output is an indication that the image 126 includes a "sign" and the number "60." Utilizing the known target output, the weights of the DCN 100 may then be adjusted through training so that a subsequent output 122 of the DCN 100 achieves the target output (with high probabilities).

To adjust the weights of the DCN 100, a learning algorithm may compute a gradient vector for the weights. The gradient vector may indicate an amount that an error would increase or decrease if a weight were adjusted in a particular way. The weights may then be adjusted to reduce the error. This manner of adjusting the weights may be referred to as "backpropagation" because this adjustment process involves a "backward pass" through the layers of the DCN 100.

In practice, the error gradient of weights may be calculated over a small number of examples, so that the calculated gradient approximates the true error gradient. This approximation method may be referred to as "stochastic gradient descent." Stochastic gradient descent may be repeated until the achievable error rate of the entire system has stopped decreasing or until the error rate has reached a target level.

After training, the DCN 100 may be presented with new images, and the DCN 100 may generate inferences, such as classifications, or probabilities of various features being in the new image.

Convolution Techniques for Convolutional Neural Networks

Convolution is generally used to extract useful features from an input data set. For example, in convolutional neural networks, such as described above, convolution enables the extraction of different features using kernels and/or filters whose weights are automatically learned during training. The extracted features are then combined to make inferences.

An activation function may be applied before and/or after each layer of a convolutional neural network. Activation functions are generally mathematical functions that determine the output of a node of a neural network. Thus, the activation function determines whether a node should pass information or not, based on whether the node's input is relevant to the model's prediction. In one example, where y=conv(x) (i.e., y is the convolution of x), both x and y may be generally considered as "activations." However, in terms of a particular convolution operation, x may also be referred to as "pre-activations" or "input activations" as x exists before the particular convolution, and y may be referred to as "output activations" or a "feature map."

Figure 2:
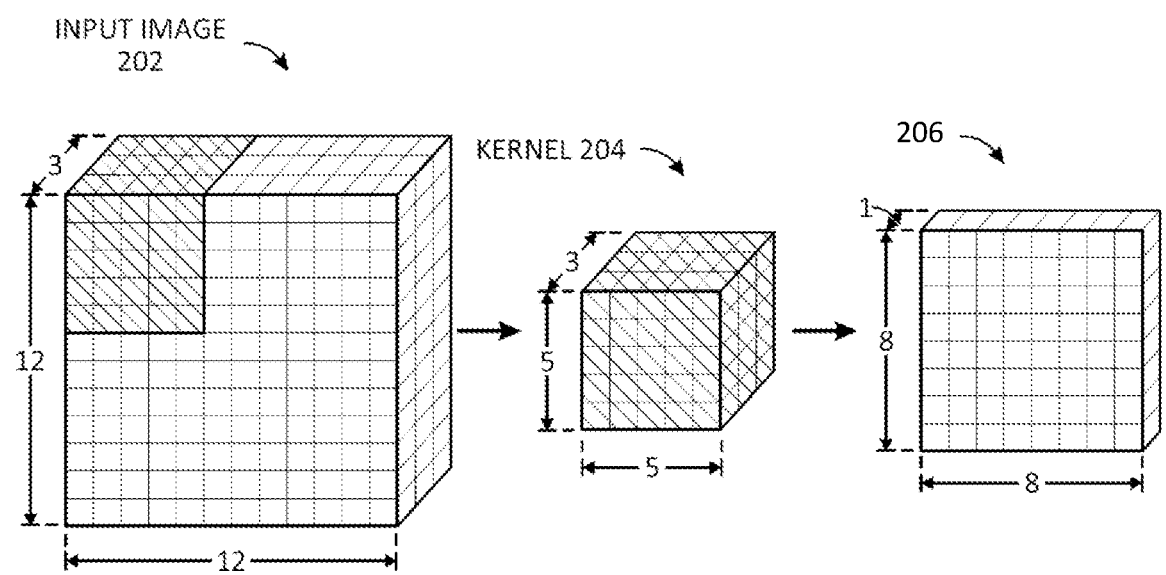
FIG. 2 depicts an example of a traditional convolution operation, which may be implemented by aspects of the present disclosure.

FIG. 2 depicts an example of a traditional convolution in which a 12-pixel×12-pixel×3-channel input image is convolved using a 5×5×3 convolution kernel 204 and a stride (or step size) of 1. The resulting feature map 206 is 8 pixels×8 pixels×1 channel. As seen in this example, the traditional convolution may change the dimensionality of the input data as compared to the output data (here, from 12×12 to 8×8 pixels), including the channel dimensionality (here, from 3 channels to 1 channel).

Figure 3A:
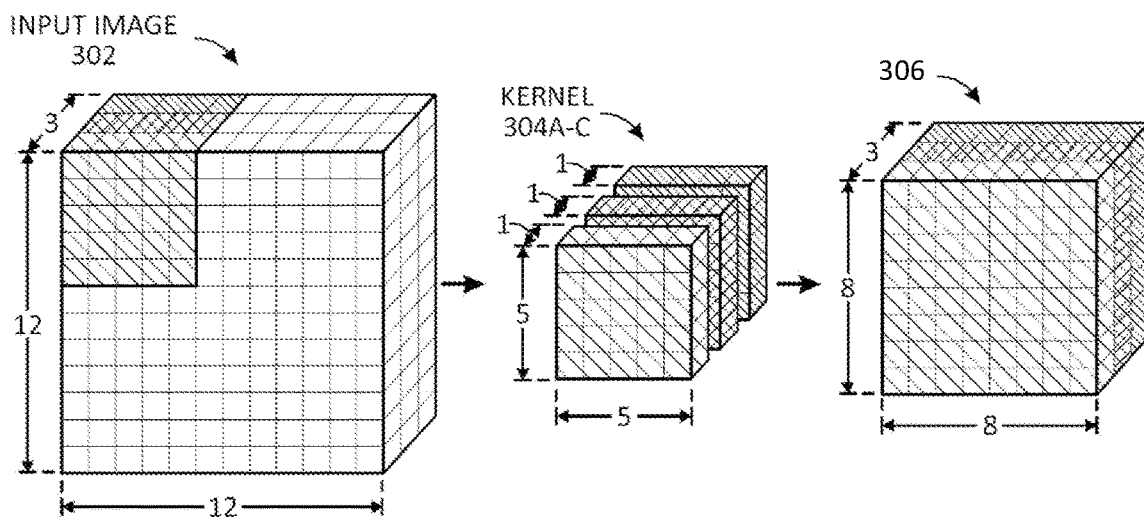
FIGS. 3A and 3B depict examples of depthwise separable convolution operations, which may be implemented by aspects of the present disclosure.
Figure 3B:
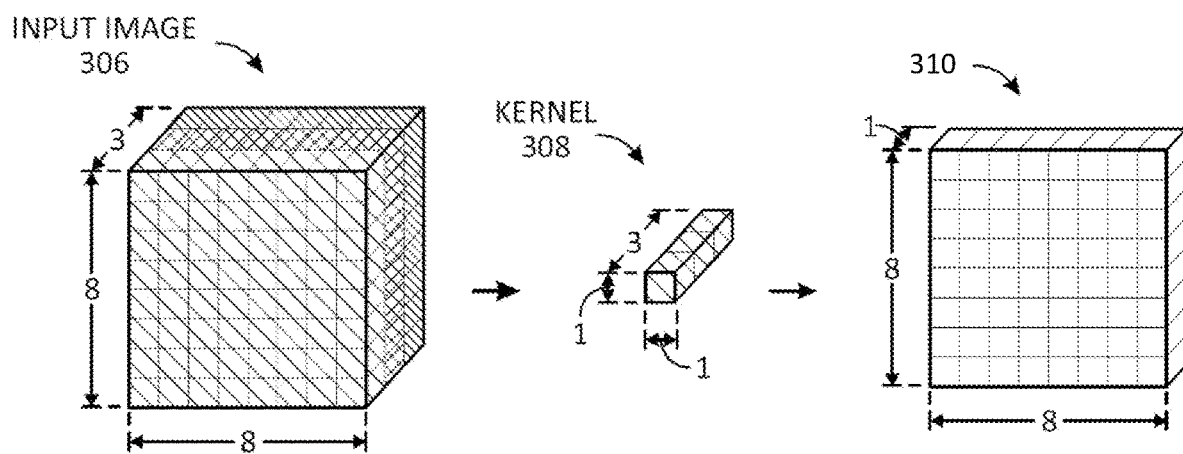

One way to reduce the computational burden (e.g., measured in floating-point operations per second (FLOPs)) and the number of parameters associated with a neural network comprising convolutional layers is to factorize the convolutional layers. For example, a spatial separable convolution, such as depicted in FIG. 2, may be factorized into two components: (1) a depthwise convolution, where each spatial channel is convolved independently by a depthwise convolution (e.g., a spatial fusion); and (2) a pointwise convolution, where all the spatial channels are linearly combined (e.g., a channel fusion). An example of a depthwise separable convolution is depicted in FIGS. 3A and 3B. Generally, during spatial fusion, a network learns features from the spatial planes, and during channel fusion, the network learns relations between these features across channels.

In one example, a depthwise separable convolution may be implemented using 5×5 kernels for spatial fusion, and 1×1 kernels for channel fusion. In particular, the channel fusion may use a 1×1×d kernel that iterates through every single point in an input image of depth d, where the depth d of the kernel generally matches the number of channels of the input image. Channel fusion via pointwise convolution is useful for dimensionality reduction for efficient computations. Applying 1×1×d kernels and adding an activation layer after the kernel may give a network added depth, which may increase the network's performance.

In particular, in FIG. 3A, the 12-pixel×12-pixel×3-channel input image 302 is convolved with a filter comprising three separate kernels 304A-C, each having a 5×5×1 dimensionality, to generate a feature map 306 of 8 pixels×8 pixels×3 channels, where each channel is generated by an individual kernel among kernels 304A-C.

Then, feature map 306 is further convolved using a pointwise convolution operation with a kernel 308 having dimensionality 1×1×3 to generate a feature map 310 of 8 pixels×8 pixels×1 channel. As is depicted in this example, feature map 310 has reduced dimensionality (1 channel versus 3 channels), which allows for more efficient computations therewith.

Though the result of the depthwise separable convolution in FIGS. 3A and 3B is substantially similar to the traditional convolution in FIG. 2, the number of computations is significantly reduced, and thus depthwise separable convolution offers a significant efficiency gain where a network design allows it.

Though not depicted in FIG. 3B, multiple (e.g., m) pointwise convolution kernels 308 (e.g., individual components of a filter) can be used to increase the channel dimensionality of the convolution output. So, for example, m=256 1×1×3 kernels 308 can be generated, in which each output is an 8-pixel×8-pixel×1-channel feature map (e.g., feature map 310), and these feature maps can be stacked to get a resulting feature map of 8 pixels×8 pixels×256 channels. The resulting increase in channel dimensionality provides more parameters for training, which may improve a convolutional neural network's ability to identify features (e.g., in input image 302).

Example Computation-in-Memory (CIM) Architecture

Digital computation-in-memory (CIM) is used to solve the energy and speed bottlenecks arising from moving data between a processing unit and memory for logical operations. For example, digital CIM may be used to perform a logic operation in memory, such as bit-parallel/bit-serial logic operations (e.g., an AND operation). However, machine learning workloads still involve a final accumulation, which may be performed using circuitry external to the memory array. Since each row in the memory is read sequentially, a high-speed and energy-efficient accumulator near the memory may be implemented to achieve better performance (e.g., increase the tera-operations per second (TOPS)).

Figure 4:
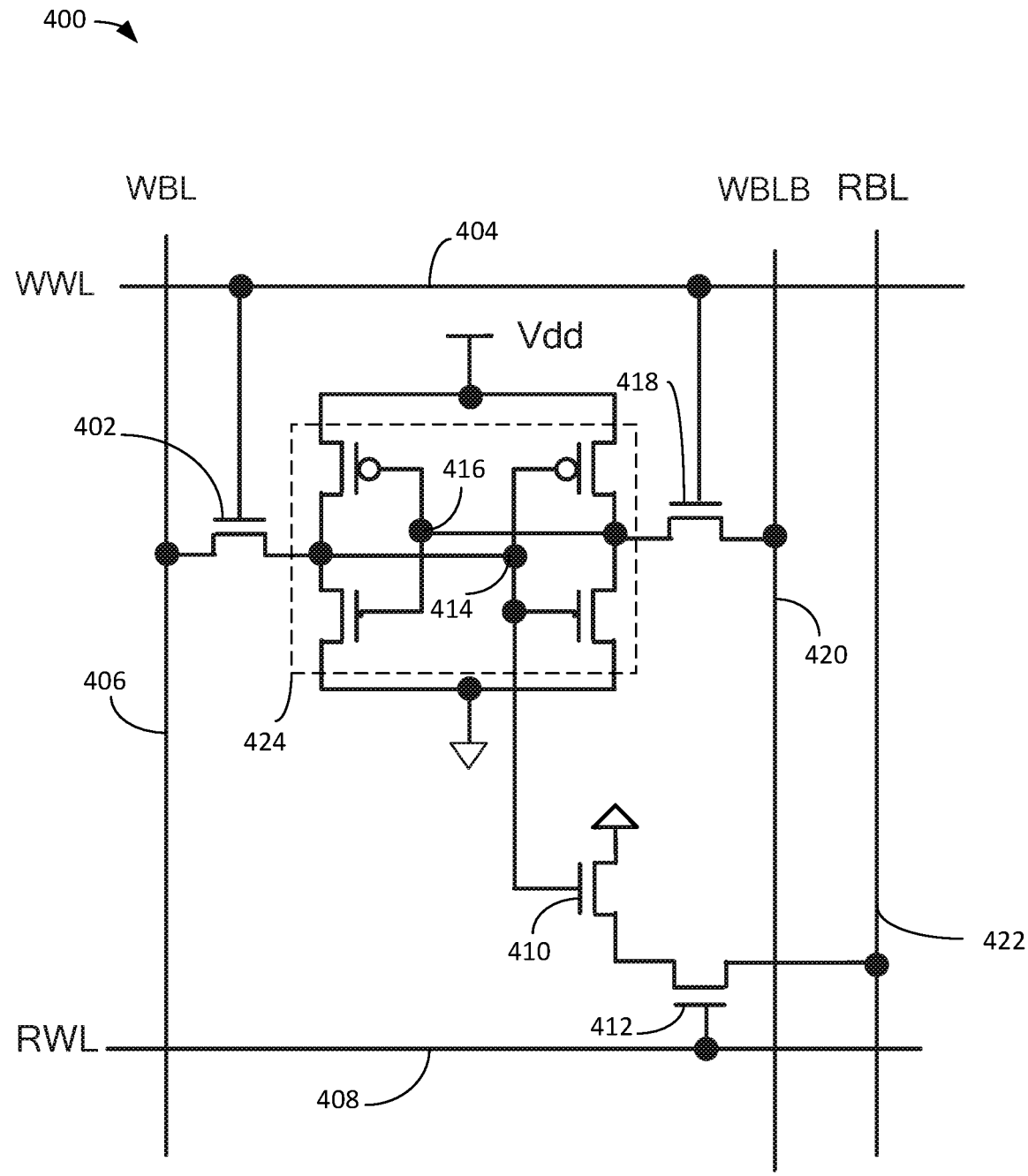
FIG. 4 illustrates an example memory cell implemented as an eight-transistor (8 T) static random access memory (SRAM) cell for a computation-in-memory (CIM) circuit.

FIG. 4 illustrates an example memory cell 400 of a static random access memory (SRAM), which may be implemented in a CIM array. The memory cell 400 may be referred to as an "8-transistor (8 T) SRAM cell" as the memory cell 400 is implemented with eight transistors.

As shown, the memory cell 400 may include a cross-coupled invertor pair 424 having an output 414 and an output 416. As shown, the cross-coupled invertor pair output 414 is selectively coupled to a write bit-line (WBL) 406 via a pass-gate transistor 402, and the cross-coupled invertor pair output 416 is selectively coupled to a complementary write bit-line (WBLB) 420 via a pass-gate transistor 418. The WBL 406 and WBLB 420 are configured to provide complementary digital signals to be written (e.g., stored) in the cross-coupled invertor pair 424. The WBL and WBLB may be used to store a bit for a neural network weight in the memory cell 400. The gates of pass-gate transistors 402, 418 may be coupled to a write word-line (WWL) 404, as shown. For example, a digital signal to be written may be provided to the WBL (and a complement of the digital signal is provided to the WBLB). The pass-gate transistors 402, 418—which are implemented here as n-type field-effect transistors (NFETs)—are then turned on by providing a logic high signal to WWL 404, resulting in the digital signal being stored in the cross-coupled invertor pair 424.

As shown, the cross-coupled invertor pair output 414 may be coupled to a gate of a transistor 410. The source of the transistor 410 may be coupled to a reference potential node (VSS or electrical ground), and the drain of the transistor 410 may be coupled to a source of a transistor 412. The drain of the transistor 412 may be coupled to a read bit-line (RBL) 422, as shown. The gate of transistor 412 may be controlled via a read word-line (RWL) 408. The RWL 408 may be controlled via an activation input signal.

During a read cycle, the RBL 422 may be precharged to logic high. If both the activation input on the RWL 408 and the weight bit stored at the cross-coupled invertor pair output 414 are logic high, then transistors 410, 412 are both turned on, electrically coupling the RBL 422 to VSS at the source of transistor 410 and discharging the RBL 422 to logic low. If either the activation input on RWL 408 or the weight stored at the cross-coupled invertor pair output 414 is logic low, then at least one of transistors 410, 412 will be turned off, such that the RBL 422 remains logic high. Thus, the output of the memory cell 400 at RBL 422 is logic low only when both the weight bit and activation input are logic high, and is logic high otherwise, effectively implementing a NAND-gate operation.

Figure 5:
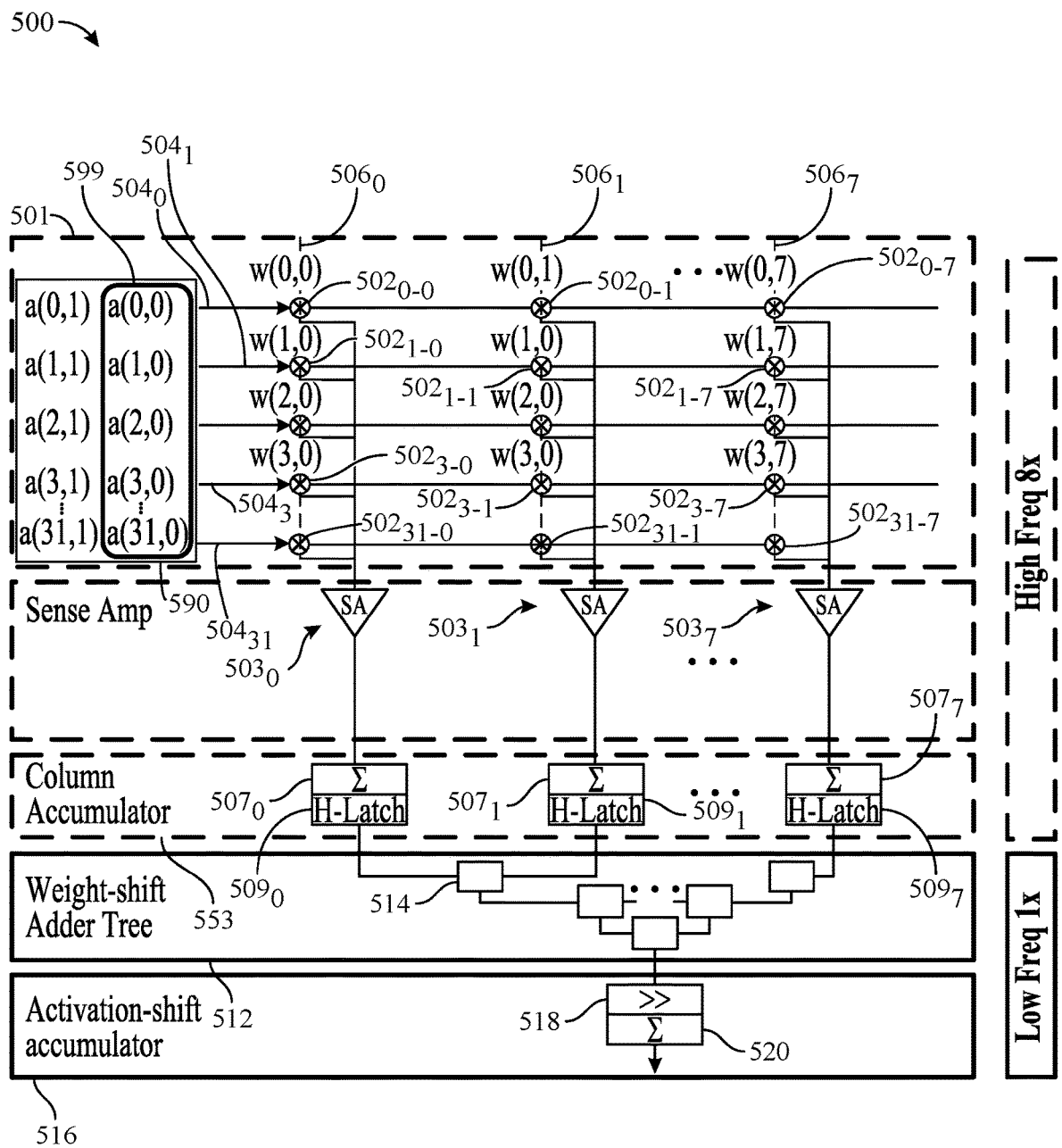
FIG. 5 illustrates a circuit for CIM, in accordance with certain aspects of the present disclosure.

FIG. 5 illustrates a circuit 500 for CIM, in accordance with certain aspects of the present disclosure. The circuit 500 includes a CIM array 501 having word-lines $504_0$ to $504_{31}$ (also referred to as "rows") and columns $506_0$ to $506_7$. Word-lines $504_0$ to $504_{31}$ are collectively referred to as "word-lines (WLs) 504," and columns $506_0$ to $506_7$ are collectively referred to as "columns 506." As shown, the CIM array 501 may include activation circuitry 590 configured to provide activation signals to word-lines 504. While the CIM array 501 is implemented with 32 word-lines and 8 columns to facilitate understanding, the CIM array may be implemented with any number of word-lines or columns. As shown, memory cells $502_{0-0}$ to $502_{31-7}$ (collectively referred to as "memory cells 502") are implemented at the intersections of the WLs 504 and columns 506.

Each of the memory cells 502 may be implemented using the memory cell architecture described with respect to FIG. 4. As shown, activation inputs a(0,0) to a(3 1,0) may be provided to respective word-lines 504, and the memory cells 502 may store neural network weights w(0,0) to w(31,7). For example, memory cells $502_{0-0}$ to $502_{0-7}$ may store weight bits w(0,0) to w(0,7), memory cells $502_{1-0}$ to $502_{1-7}$ may store weight bits w(1,0) to w(1,7), and so on. Each word-line may store a multi-bit weight. For example, weight bits w(0,0) to w(0,7) may represent eight bits of a weight of a neural network.

As shown, each of the columns 506 is coupled to a sense amplifier (SA) $503_0$ to $503_7$. The sense amplifiers $503_0$, $503_1$, to $503_7$ are collectively referred to as "sense amplifiers 503." The input of each of the sense amplifiers 503 may be coupled to outputs of the memory cells on a respective column, as shown.

The outputs of the sense amplifiers 503 are coupled to a column accumulator circuit 553. For example, the outputs of each of sense amplifiers 503 is coupled to one of accumulators $507_0$, $507_1$, to $507_7$ (collectively referred to as "accumulators 507") of the column accumulator circuit 553. Each of the accumulators 507 performs accumulation of output signals of a respective one of the sense amplifiers 503 across multiple computation cycles. For example, during each computation cycle, computation is performed for a single word-line, and the output signal of the computation for the word line is accumulated with output signals during other computation cycles using a respective one of the accumulators 507. After multiple computation cycles (e.g., 32 cycles for 32 word-lines), each of the accumulators 507 provides an accumulation result.

During operation of the circuit 500, activation circuitry 590 provides a first set 599 of activation inputs a(0,0) to a(31,0) to the memory cells 502 for computation during a first activation cycle. The activation inputs a(0,0) to a(31,0) are provided one row at a time, and the outputs of each computation for each row is accumulated using a respective one of accumulators 507, as described. The same operation is performed for other sets of activation inputs during subsequent activation cycles, such as activation inputs a(0,1) to a(31,1) representing the second most significant bits of the activation parameters, and so on until activation inputs representing the least-significant bits of the activation parameters are processed.

Once the multiple computation cycles have been completed during each activation cycle, the outputs of the accumulators 507 are provided to the weight-shift adder tree circuit 512 for addition across columns, and the output of the weight-shift adder tree circuit 512 is provided to the activation-shift accumulator circuit 516 for accumulation across activation cycles. In other words, the activation-shift accumulator circuit 516 accumulates the computation results after the activation cycles are completed.

The weight-shift adder tree circuit 512 includes multiple weight-shift adders (e.g., weight-shift adder 514), each including a bit-shift-and-add circuit to facilitate the performance of a bit-shifting and addition operation. In other words, memory cells on column $506_0$ may store the most significant bits (MSBs) for respective weights, and memory cells on column $506_7$ may store the least significant bits (LSBs) for respective weights. Therefore, when performing the addition across columns 506, a bit-shifting operation is performed to shift the bits to account for the significance of the bits on the associated column. In other words, once the bit-wise accumulation occurs at each of the accumulators 507 across multiple computation cycles, the weight-shift adder tree circuit 512 combines the eight columns of weighted sums (e.g., providing the accumulation result for a given activation bit position during each activation cycle), and the activation-shift accumulator circuit 516 combines the results from multiple (e.g., eight) activation cycles to output a final accumulation result.

The output of the weight-shift adder tree circuit 512 is provided to an activation-shift accumulator circuit 516, as described. The activation-shift accumulator circuit 516 includes a bit-shift circuit 518 and an accumulator 520. The bit-shift circuit 518 performs a bit-shifting operation based on the activation cycle. For example, for an 8-bit activation parameter processed using eight activation cycles, the bit-shift circuit may perform an 8-bit shift for the first activation cycle, a 7-bit shift for the second activation cycle, and so on. After the activation cycles, the outputs of the bit-shift circuit 518 are accumulated using the accumulator 520 to generate a DCIM output signal.

In some aspects, the CIM array 501, the activation circuitry 590 and the column accumulator circuit 553 operate at a higher frequency (e.g., eight times or more) than the weight-shift adder tree circuit 512 and activation-shift accumulator circuit 516. As shown, half-latch circuits $509_0$, $509_1$, to $509_7$ (collectively referred to as "half-latch circuits 509") may be coupled to respective outputs of the accumulators 507. Each half-latch circuit holds the output of a respective one of the accumulators 507, and provides the output to a respective input of the weight-shift adder tree circuit 512 once the multiple computations cycles have been completed. In other words, a half-latch circuit generally refers to a latch circuit that holds a digital input (e.g., an output of one of accumulators 507) at a beginning of a clock cycle and provides the digital input to an output of the latch circuit at the end of the clock cycle. The half-latch circuits 509 facilitate the transition from the higher frequency operation of the column accumulator circuit 553 to the lower frequency operation of the weight-shift adder tree circuit 512. The half-latch circuits 509 allow synchronization between clock domains without using other components (e.g., extra buffers).

Figure 6:
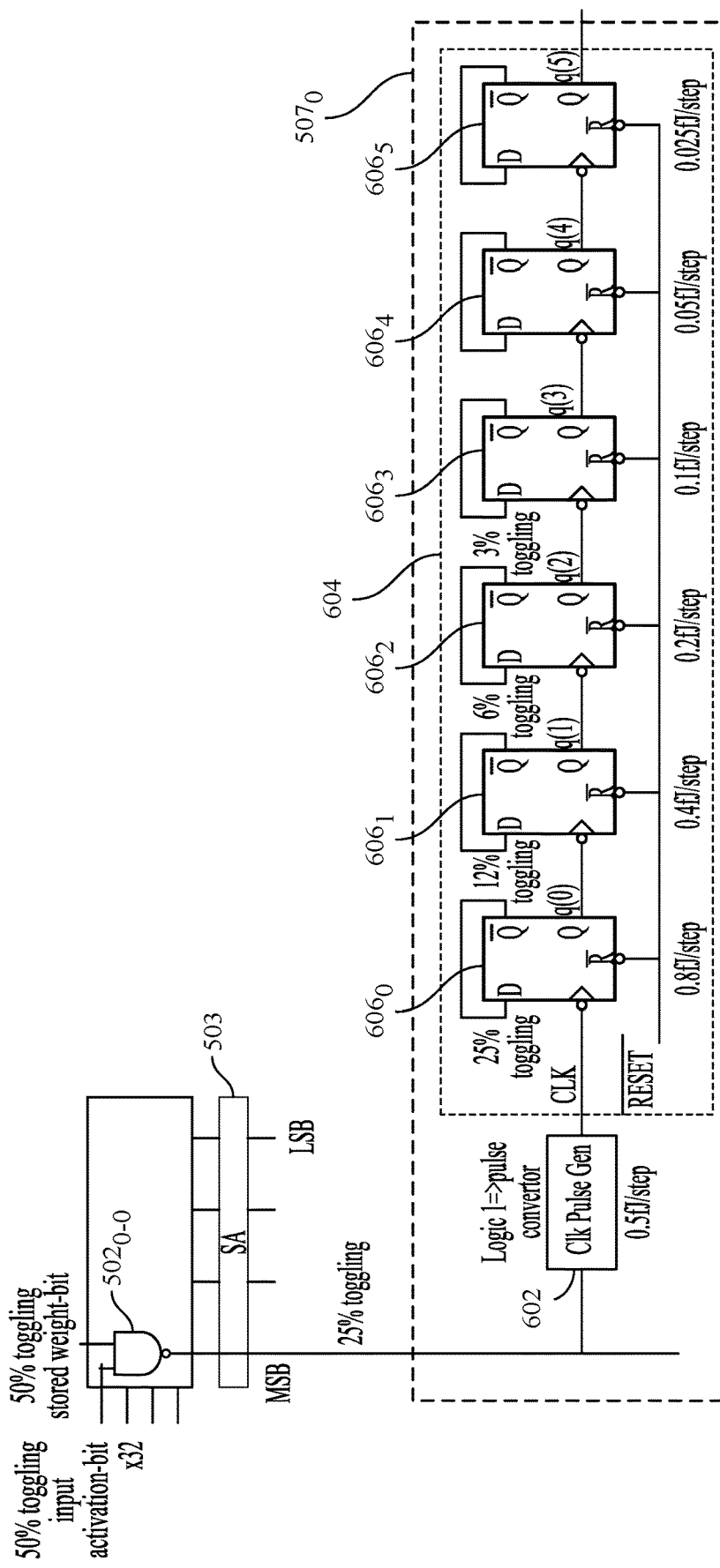
FIG. 6 illustrates digital CIM (DCIM) circuitry with an accumulator implemented using a pulse generator and digital counter, in accordance with certain aspects of the present disclosure.

Certain aspects provide a digital counter (e.g., a ones counter configured to count a quantity of logic highs in the time domain) enabling adder-free partial sum generation, as described in more detail with respect to FIG. 6. In other words, each of accumulators 507 may be implemented using a digital counter that counts a quantity of logic highs provided at the output of a respective one of sense amplifiers 503.

FIG. 6 illustrates DCIM circuitry with an accumulator (e.g., one of accumulators 507) implemented using a pulse generator 602 and digital counter 604, in accordance with certain aspects of the present disclosure. As shown, a memory cell, such as memory cell $502_{0-0}$ shown as a NAND gate in FIG. 6, may provide a computation result based on an activation input and a stored weight-bit. Each of the activation input and the stored weight-bit may have a 50% toggling probability. In other words, the activation input may have a 50% probability of being logic high and a 50% probability of being logic low. Similarly, the stored weight-bit may have a 50% probability of being logic high and a 50% probability of being logic low. As a result, the output of the NAND gate may have a 25% toggling probability (e.g., a 25% probability of being logic high and a 75% probability of being logic low), due to the NAND operation.

The pulse generator 602 generates a pulse for each logic high output of the associated sense amplifier. For example, during a first computation cycle, if the output of memory cell $502_{0-0}$ is logic high, the pulse generator 602 generates a pulse, and during a second computation cycle, if the output of the memory cell $502_{0-1}$ is logic high, the pulse generator 602 generates a pulse, and so on. The output of the pulse generator 602 is provided to the digital counter 604. The digital counter counts the number of pulses generated by the pulse generator 602, and generates a digital counter output signal (e.g., a six-bit digital signal including bits q(0)-q(5)).

As shown, the digital counter 604 includes flip-flops $606_0$ to $606_5$ (collectively referred to as "flip-flops 606") where the output of the pulse generator 602 is provided to the clock (CLK) input of flip-flop $606_0$. The complementary output ($\overline{Q}$) of each flip-flop is fed back to the data (D) input of that flip-flop, and the output (Q) of each flip-flop is provided to the CLK of a subsequent flip-flop in the flip-flop chain.

As shown, flip-flop $606_0$ has the highest energy consumption of flip-flops 606, and flip-flop $606_5$ has the lowest energy consumption of flip-flops 606. For example, if the pulse generator 602 consumes 0.5 femtojoules (fJ) per step (e.g., per computation cycle), then flip-flop $606_0$ consumes 0.8 fJ/step, flip-flop $606_1$ consumes 0.4 fJ/step, flip-flop $606_2$ consumes 0.2 fJ/step, flip-flop $606_3$ consumes 0.1 fJ/step, flip-flop $606_4$ consumes 0.05 fJ/step, and flip-flop $606_5$ consumes 0.025 fJ/step. In other words, flip-flop $606_0$ generates the least significant bit (LSB) q(0) of the digital counter output signal, and the flip-flop $606_5$ generates the most significant bit (MSB) q(5) of the digital counter output signal. The energy consumption of flip-flop $606_0$ is double the energy consumption of flip-flop $606_1$ because the output of the flip-flop $606_1$ has half the toggling probability as the output of flip-flop $606_0$. Similarly, the energy consumption of flip-flop $606_1$ is double the energy consumption of flip-flop $606_2$ because the output of the flip-flop $606_2$ has half the toggling probability as the output of flip-flop $606_1$, and so on.

Each stage of the digital counter 604 is effectively a divide-by-two frequency divider with one flip-flop stage's toggling being controlled by the output signal of a preceding flip-flop stage. Implementing additional stages for the digital counter (e.g., increasing the number of bits of the digital counter output signal) has little impact on energy consumption of the DCIM circuitry since with additional stages, energy consumption increases asymptotically. Half-latch circuitry may be coupled to the output of the digital counter for each column to synchronize the counter's output to the slow-clock domain (DCIM clock). In other words, each of bits q(0)-q(5) may be provided to a half-latch circuit (e.g., one of half-latch circuits 509). In some aspects, delay circuitry may be used to reduce interference between columns of the memory, as described in more detail with respect to FIG. 7.

Figure 7:
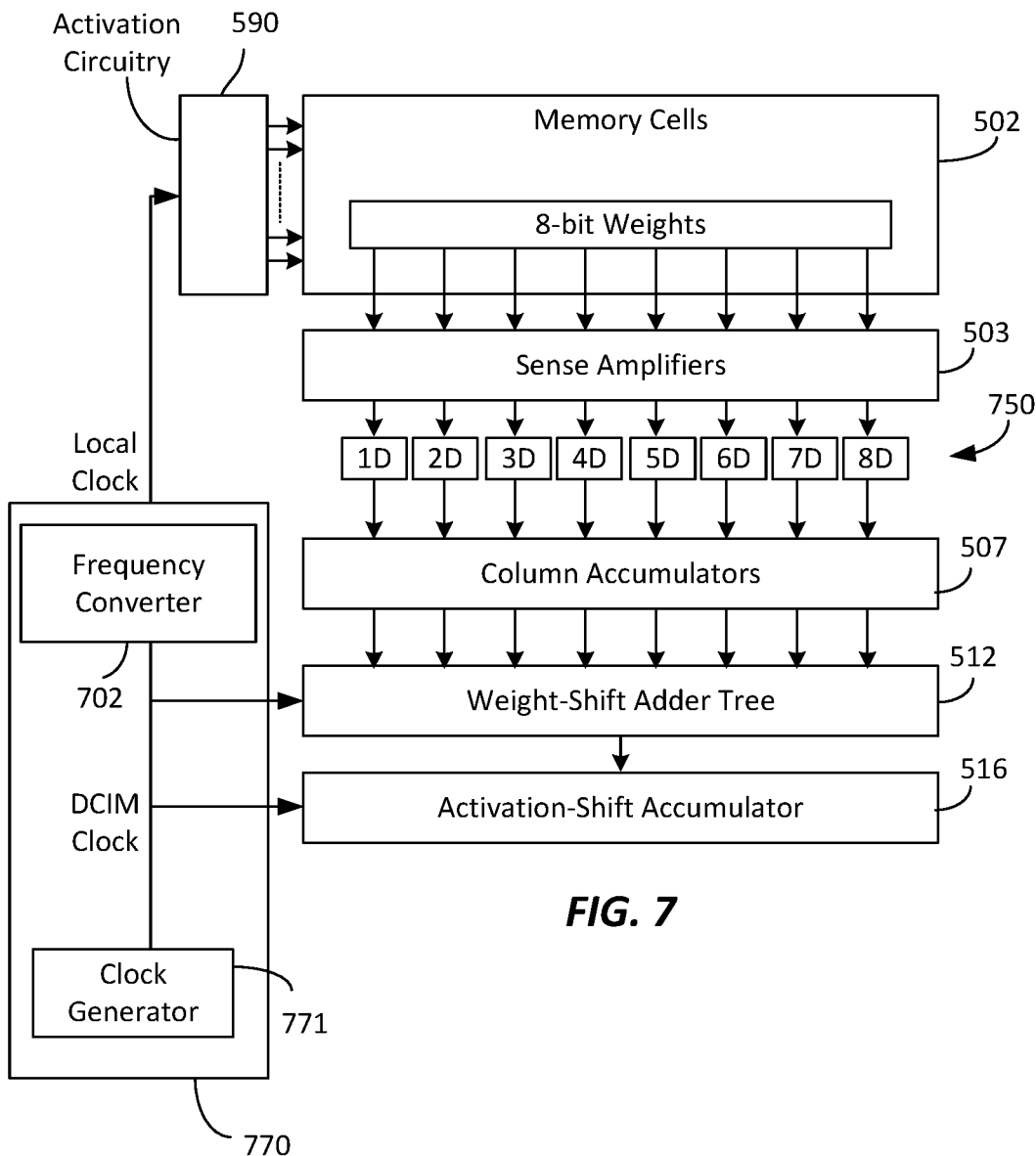
FIG. 7 is a block diagram illustrating CIM circuitry implemented using delay circuitry to reduce electromagnetic interference (EMI), in accordance with certain aspects of the present disclosure.

FIG. 7 is a block diagram illustrating CIM circuitry implemented using delay circuitry to reduce electromagnetic interference (EMI), in accordance with certain aspects of the present disclosure. For example, as shown, 8-bit weights may be stored in the memory cells 502 and processed using the sense amplifiers 503, column accumulators 507, weight-shift adder tree circuit 512, and activation-shift accumulator circuit 516, as described herein. Delay circuits 750 (e.g., being associated with different delays) may be implemented between the sense amplifiers 503 and the column accumulators 507, implementing an offset to the phase of signals provided to the column accumulators 507. For example, a single delay element (labeled as "1D") may be coupled between the sense amplifier $503_0$ and the column accumulator $507_0$, two delay elements (labeled as "2D") may be coupled between the sense amplifier $503_1$ and the column accumulator $507_1$, and so on. In this manner, falling/rising edges of signals provided to the column accumulators 507 are offset, reducing EMI between columns. In other words, a skew (e.g., via one or more delay cells) is added at the input of the digital counter 604 to reduce EMI due to what would otherwise be simultaneous switching noise.

As shown, a clock generator circuit 770 may be used to generate the DCIM clock and local clock. For example, the clock generator circuit 770 may include a clock generator 771 configured to generate the DCIM clock. The clock generator 771 may be implemented using any suitable clock generation circuit such as a phase-locked loop (PLL) or ring oscillator. The weight-shift adder tree circuit 512 may receive and operate on the DCIM clock. For certain aspects, the clock generator circuit 770 may include a frequency converter 702 that may be used to generate the local clock from the DCIM clock, based on which the activation circuitry 590 operates. While the frequency converter 702 is shown as being part of the clock generator circuit 770, the frequency converter 702 may be separate from the clock generator circuit 770 in some implementations. A frequency converter generally refers to any circuit that receives a clock signal with a first frequency and generates a second clock signal with a second different frequency.

The frequency converter may be implemented using any suitable technique. For example, the frequency converter may be implemented as a ring oscillator (RO) modulated by system clock timing (e.g., modulated using the DCIM clock), or by generating pulses from rising or falling edges of a system clock, as described in more detail with respect to FIGS. 8A and 8B. In this manner, the local clock may have a rising edge that is in sync with the DCIM clock.

Figure 8A:
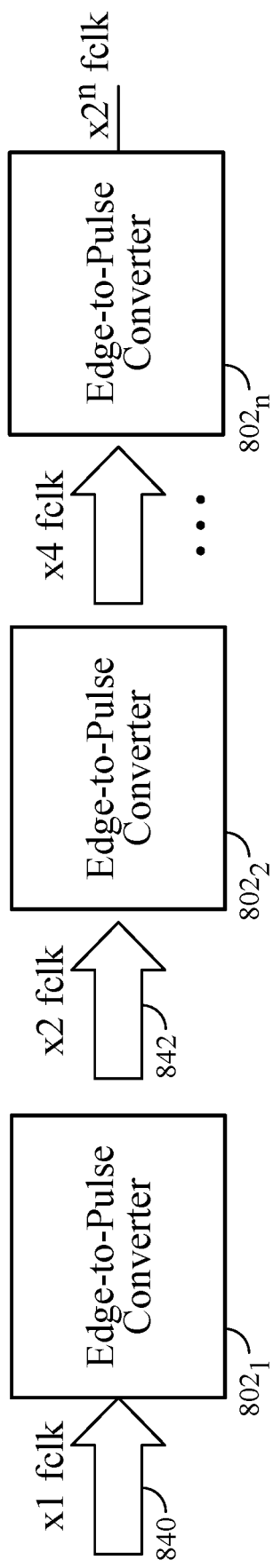
FIG. 8A is a block diagram showing an example implementation of a frequency converter, in accordance with certain aspects of the present disclosure.
Figure 8B:
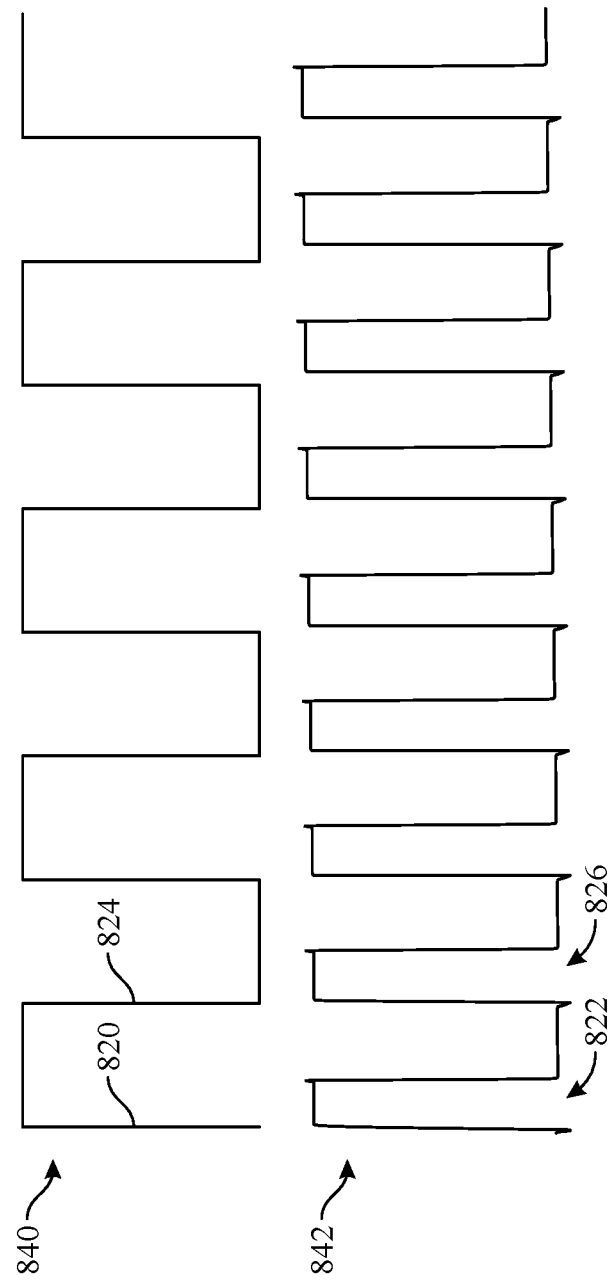
FIG. 8B is a graph showing an input signal and an output signal of an edge-to-pulse converter, in accordance with certain aspects of the present disclosure.

FIG. 8A is a block diagram showing an example implementation of the frequency converter 702, in accordance with certain aspects of the present disclosure. FIG. 8B is a graph showing an input signal 840 and an output signal 842 of an edge-to-pulse converter. The frequency converter 702 may include one or multiple edge-to-pulse converters $802_1$, $802_2$ to $802_n$ (collectively referred to as "edge-to-pulse converters 802"). Each of the edge-to-pulse converters 802 generates a pulse at each rising edge and each falling edge of an input signal presented to the edge-to-pulse converter. For example, as shown in FIG. 8B, the edge-to-pulse converter $802_1$ generates a pulse 822 after detecting the rising edge 820 of the input signal 840 and another pulse 826 after detecting the falling edge 824 of the input signal 840. In this manner, the output signal 842 of the edge-to-pulse converter is twice the frequency of the input signal 840 of the edge-to-pulse converter. Using multiple edge-to-pulse converters in series allows for upconversion of the frequency of the DCIM clock to generate the local clock, as described with respect to FIG. 7. While edge-to-pulse converters are provided as one example of a frequency converter, any suitable type of frequency converter may be used.

Figure 9A:
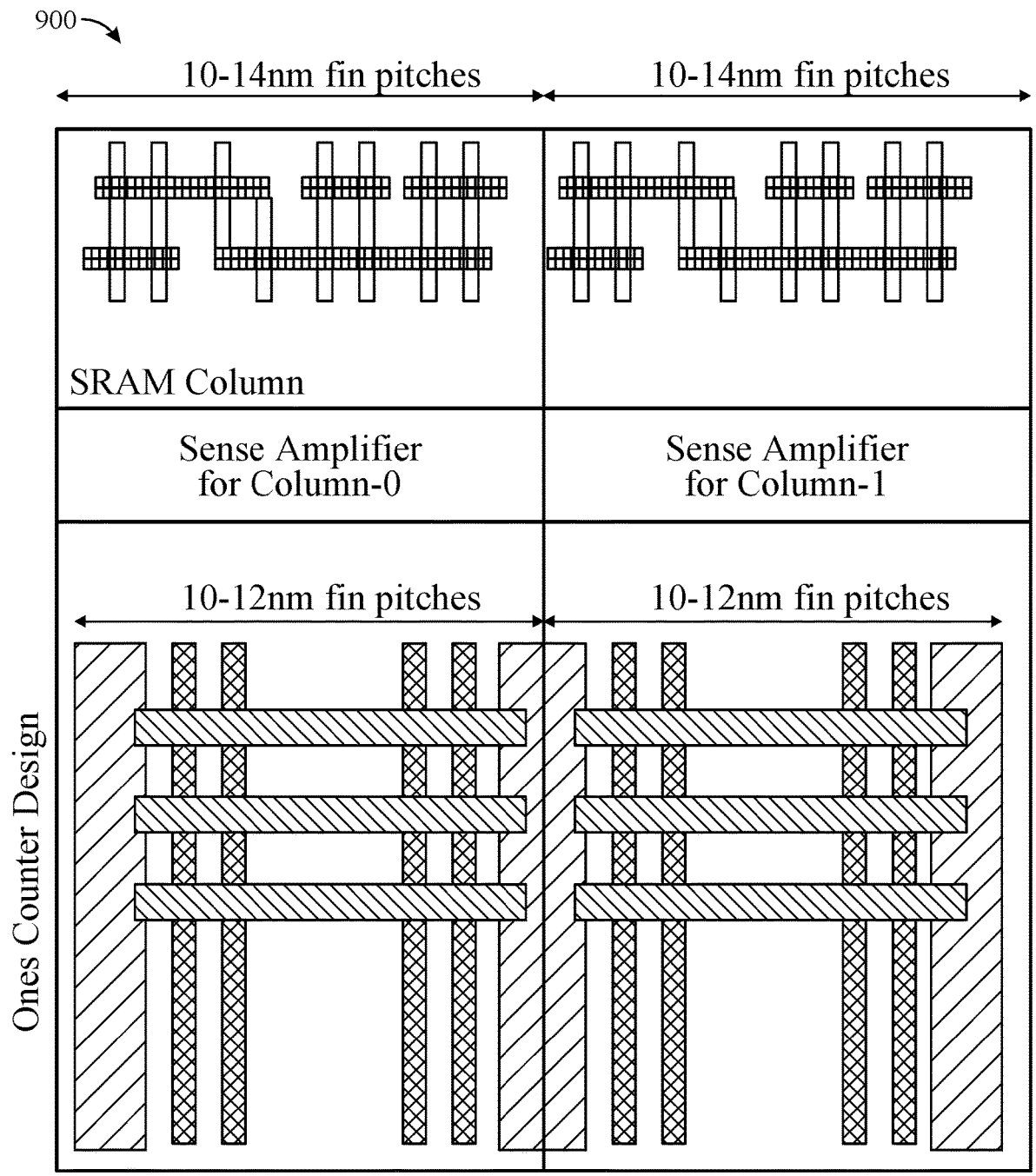
FIGS. 9A and 9B illustrate an integrated circuit (IC) layout for implementing a DCIM circuit, in accordance with certain aspects of the present disclosure.
Figure 9B:
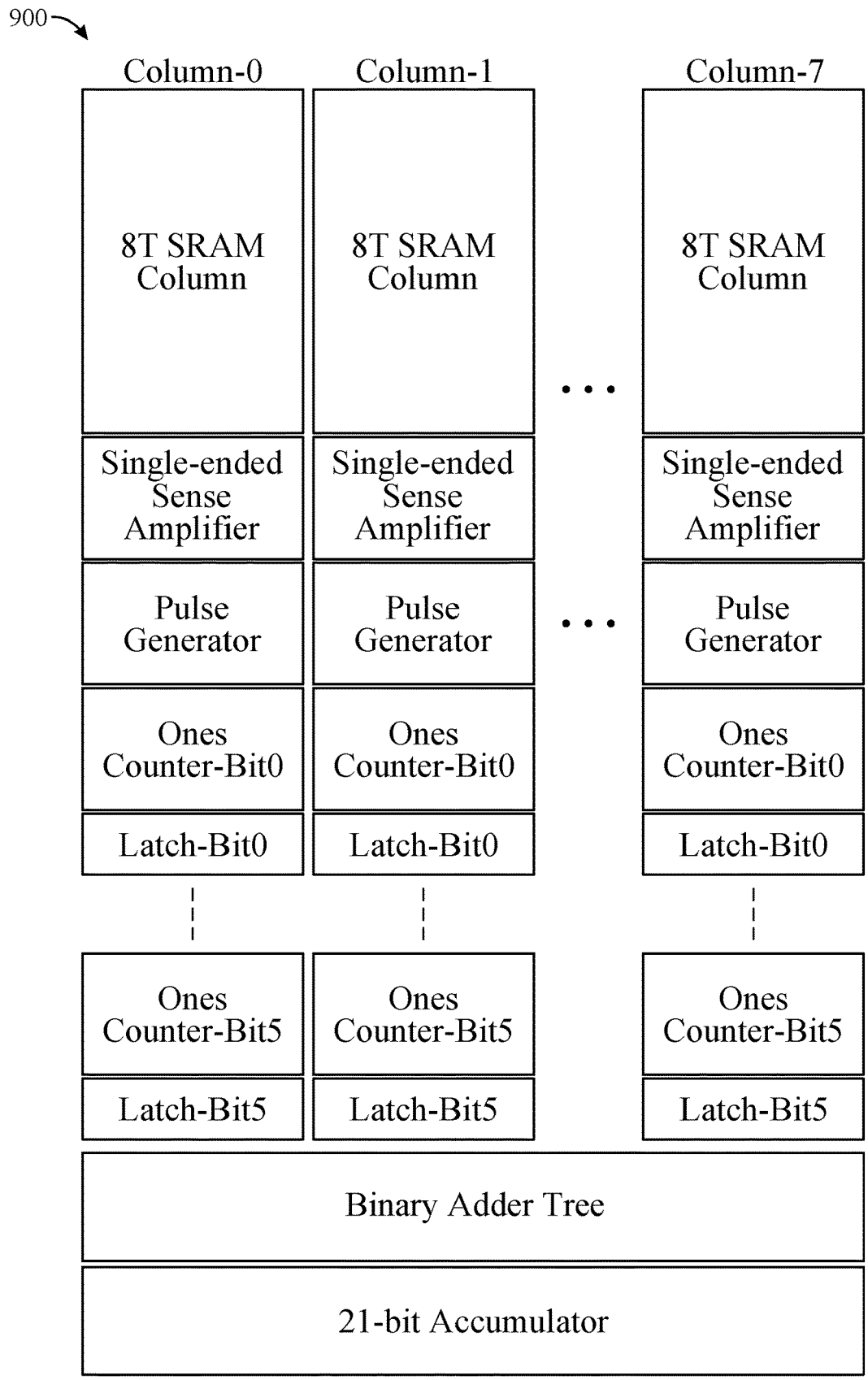

FIGS. 9A and 9B illustrate an integrated circuit (IC) layout 900 for implementing a DCIM circuit, in accordance with certain aspects of the present disclosure. As shown in FIG. 9A, each SRAM column may be implemented using fins (e.g., for implementing fin field-effect transistors (FinFETs)) and may have 10-14 nm fin pitches. A fin pitch refers to a distance from one fin to an adjacent fin. The memory cells of the SRAM column are coupled to a sense amplifier, as described herein. The output of the sense amplifier is coupled to a digital counter implemented using flip-flops cascaded along each column having fins, as shown. The counter design may have 10-12 nm fin pitches.

As shown in FIG. 9B, each column may include an eight-transistor (8 T) SRAM column (e.g., a column of memory cells, each cell implemented using 8 transistors), a single-ended sense amplifier (e.g., sense amplifier $503_0$), a pulse generator (e.g., pulse generator 602), one's counter circuitry (e.g., a respective one of flip-flops 606) for generating each of bits $q(0)$ to $q(5)$ as shown in FIG. 6, and a latch circuit for each of bits $q(0)$ to $q(5)$. A binary adder tree (e.g., weight-shift adder tree circuit 512) and accumulator (e.g., activation-shift accumulator circuit 516) are also coupled to the output of the latch circuits, as shown. In some aspects, a multiplexer may be used to facilitate reuse of the adder tree circuit 512 and accumulator circuit 516, as described in more detail with respect to FIG. 10.

Figure 10:
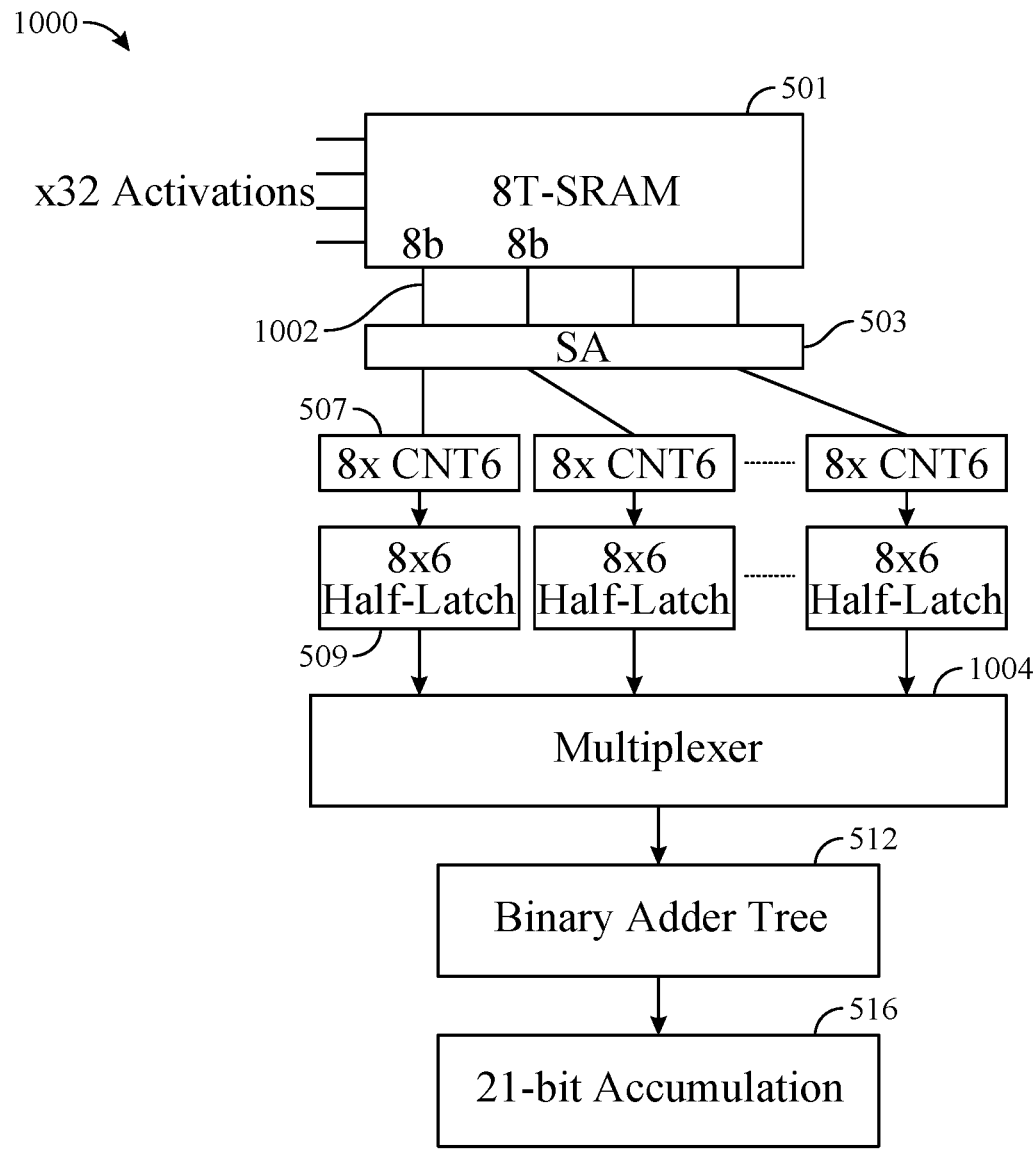
FIG. 10 illustrates a DCIM circuit implemented using a multiplexer to facilitate reuse of an adder tree and accumulator, in accordance with certain aspects of the present disclosure.
Figure 10:
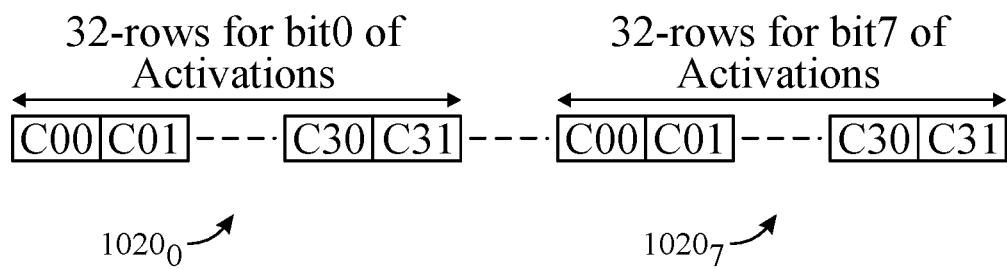

FIG. 10 illustrates a DCIM circuit 1000 implemented using a multiplexer 1004 to facilitate reuse of an adder tree and accumulator, in accordance with certain aspects of the present disclosure. As shown, the CIM array 501 (e.g., including 8 T SRAM cells) may include multiple weight column groups, each weight column group having a set of columns associated with a weight parameter having multiple bits. For example, the weight column group 1002 may refer to columns 506 storing 8-bit weights on each row. As shown, each weight column group may be coupled to eight accumulators (e.g., digital counters) and 48 (e.g., for the 8 accumulators×6 bits per accumulator) half-latch circuits, as described herein.

In some aspects, a partial-sum operation may be implemented using a shared accumulator (e.g., accumulator circuit 516) across weight column groups, providing one accumulation result at the end of each multiply-and-accumulate (MAC) cycle. The binary adder tree (e.g., weight-shift adder tree circuit 512) and the 21-bit accumulator (e.g., accumulator circuit 516) consume a significant portion of the total area of the DCIM circuitry. Thus, sharing the binary adder tree and the activation-shift accumulator across multiple weight column groups reduces the total area consumption of the DCIM circuitry.

As shown, during each of eight activation cycles $1020_0$ to $1020_7$ (collectively referred to as "activation cycles 1020"), 32 computation cycles occur (C00 to C031), one computation cycle for each of 32 rows as shown in FIG. 5. After the activation cycles 1020, the computation outputs for the weight column groups are available at the outputs of the half-latch circuits.

The multiplexer 1004 may be used to select each weight column group separately for processing using the adder tree circuit 512 and accumulator circuit 516. For example, during a first weight cycle, the half-latch output (e.g., 6-bit output) on a first weight column group (e.g., weight column group 1002) may be selected by the multiplexer 1004 and provided to the adder tree circuit 512 and accumulator circuit 516 for processing as described with respect to FIG. 5.

During a second weight cycle, the half-latch output (e.g., 6-bit output) on a second weight column group may be selected by the multiplexer and provided to the adder tree circuit 512 and accumulator circuit 516 for processing, and so on. Time multiplexing of latched partial sums enables reuse of the adder tree circuit 512 and accumulator circuit 516. A multiplexer select signal may be generated every two clock cycles (e.g., of the DCIM clock shown in FIG. 7) to select a new weight column group. In other words, one 21-bit accumulation result is provided by the accumulator circuit 516 for each column after every two clock cycles, one clock cycle for performing the addition via adder tree circuit 512 and another clock cycle for the accumulation via the accumulator circuit 516. In some aspects, a divide-by-two version of the DCIM clock may be used to operate the multiplexer 1004, adder tree circuit 512, and accumulator circuit 516, increasing the throughput of the addition and accumulation operations for the weight column groups.

The aspects of the present disclosure provide an innovative circuit and physical design enabling high-speed and energy-efficient accumulation for any DCIM product. The aspects described do not involve routing a clock signal to generate partial sums and are fully self-timed in nature, allowing a high-speed operation. In other words, the digital counters used to implement the accumulators 507 are timed using the output of the associated sense amplifiers 503 instead of a clock signal. Due to the data-divided clock (e.g., local clock shown in FIG. 7), the aspects of the present disclosure provide a low energy implementation of DCIM circuitry as the energy consumption of the digital counter increases asymptotically, and the accumulation for each weight column group is performed at a rate associated with the divided clock without using fast toggling partial sum components. The aspects provided herein also allow for sharing the accumulator (e.g., accumulator circuit 516) and binary adder tree (e.g., adder tree circuit 512) across the weight column groups, allowing an area reduction at the DCIM system level. The DCIM circuitry described herein also provides a less complex design (e.g., as it does not include any full-adder cells nor carry generation cells used in conventional implementations), allowing for a compact implementation. The aspects described herein also may be implemented without modifications to the SRAM array used for the CIM application. Circuits are column-matched to the SRAM array providing full array efficiency, as described with respect to FIGS. 9A and 9B. The self-timed clocking and skew (e.g., phase offset) between the processing of different columns reduce EMI caused by simultaneous switching noise, as described herein.

Example Operations for Digital Computation in Memory (DCIM)

Figure 11:
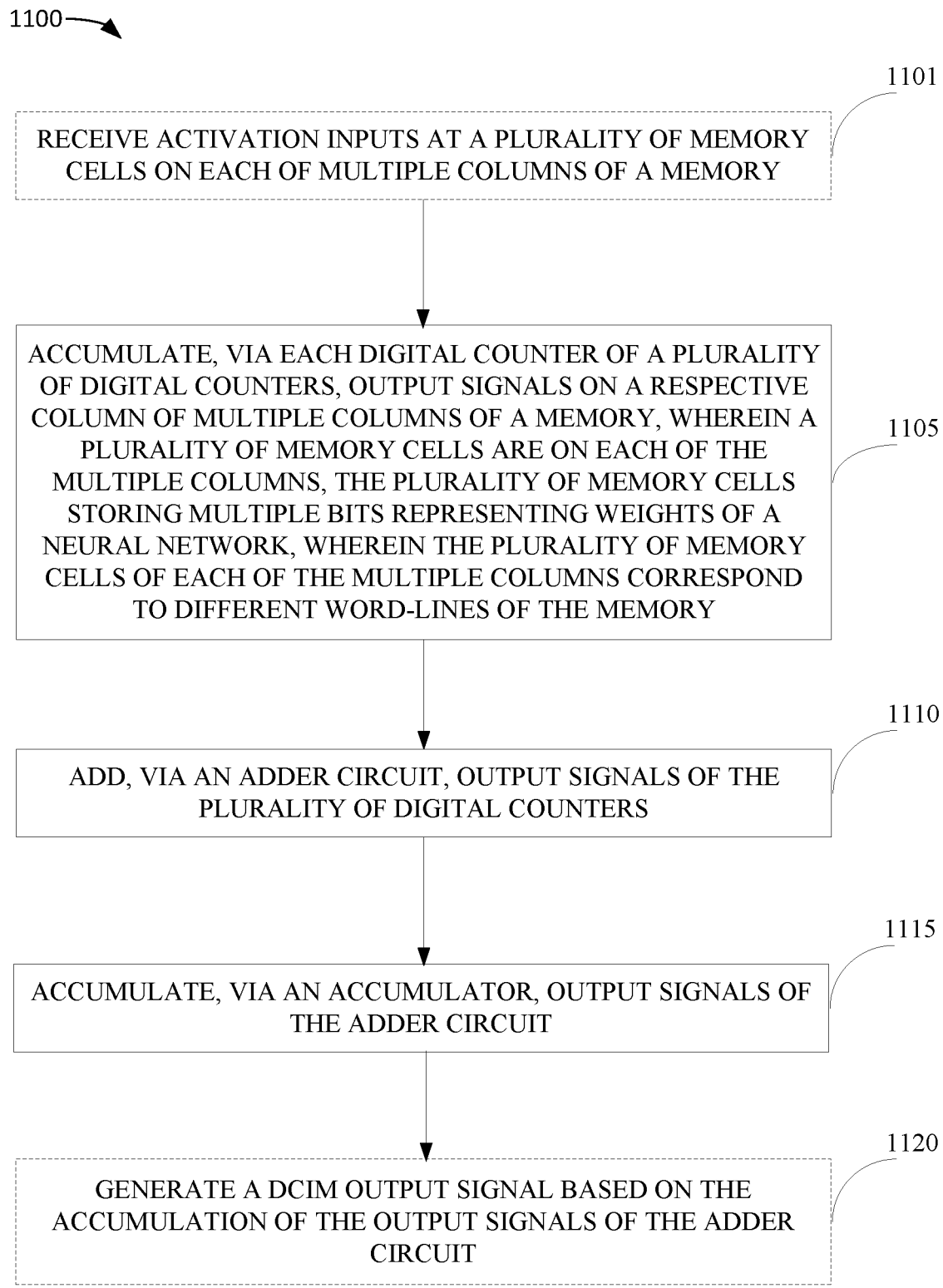
FIG. 11 is a flow diagram illustrating example operations for in-memory computation, in accordance with certain aspects of the present disclosure.

FIG. 11 is a flow diagram illustrating example operations 1100 for in-memory computation, in accordance with certain aspects of the present disclosure. The operations 1100 may be performed by a circuit for CIM, such as the circuit 500 described with respect to FIGS. 5, 6, 7, 8A, 8B, 9A, 9B, and 10.

At block 1101, the circuit may receive activation inputs at a plurality of memory cells (e.g., memory cells 502) on each of multiple columns of a memory. At block 1105 the circuit accumulates, via each digital counter of a plurality of digital counters (e.g., digital counter 604), output signals on a respective column of the multiple columns of a memory. The plurality of memory cells store multiple bits representing weights of a neural network, and the plurality of memory cells of each of the multiple columns correspond to different word-lines (e.g., word-lines 504) of the memory. In some aspects, the circuit counts, via the digital counter, a quantity of particular logic values (e.g., logic highs) of the output signals on the respective column of multiple columns. In some aspects, the circuit generates, via a pulse generator coupled to each column of the multiple columns, one or more pulses based on the output signals of the plurality of memory cells on the column, wherein accumulating the output signals via the digital counter is based on the one or more pulses.

At block 1110, the circuit adds, via an adder circuit (e.g., adder tree circuit 512), output signals of the plurality of digital counters. At block 1115, the circuit accumulates, via an accumulator (e.g., accumulator circuit 516), output signals of the adder circuit. At block 1120, the circuit may generate a DCIM output signal based on the accumulation of the output signals of the adder circuit. In some aspects, the circuit generates, via the plurality of memory cells of each of the multiple columns, output signals during multiple computation cycles, and the digital counter is configured to count a quantity of logic highs of the digital output signals.

In some aspects, the digital counter includes a set of flip-flops (e.g., flip-flops 606), where a clock input of a first flip-flop (e.g., flip-flop $606_0$) of the set of flip-flops is coupled to the column, and wherein an output of the first flip-flop is coupled to a clock input of a second flip-flop (e.g., flip-flop $606_1$) of the set of flip-flops. In some aspects, the circuit generates, via each of the set of flip-flops, a bit of the output signal generated by the digital counter. A half-latch circuit may be coupled to an output of each of the set of flip-flops.

In some aspects, the circuit applies a first delay (e.g., via one of delay circuits 750) to the output signals generated by the plurality of memory cells on a first column of the multiple columns, and applies a second delay (e.g., via another one of the delay circuits 750) to the output signals generated by the plurality of memory cells on a second column of the multiple columns. The first delay may be different than the second delay.

In certain aspects, the circuit accumulates, via each digital counter of another plurality of digital counters, output signals on a respective column of multiple other columns of the memory, wherein another plurality of memory cells are on each of the multiple other columns, the other plurality of memory cells storing multiple bits representing weights of the neural network, wherein the other plurality of memory cells of each of the multiple other columns correspond to different word-lines of the memory. The circuit may select, via a multiplexer (e.g., multiplexer 1004), the output signals from the plurality of digital counters during a first weight cycle, the output signals being added via the adder circuit based on the selection of the output signals. The circuit may also select, via the multiplexer, other output signals from the other plurality of digital counters during a second weight cycle, and add, via the adder circuit, the other output signals based on the selection of the other output signals.

Example Processing Systems for Computation in Memory

Figure 12:
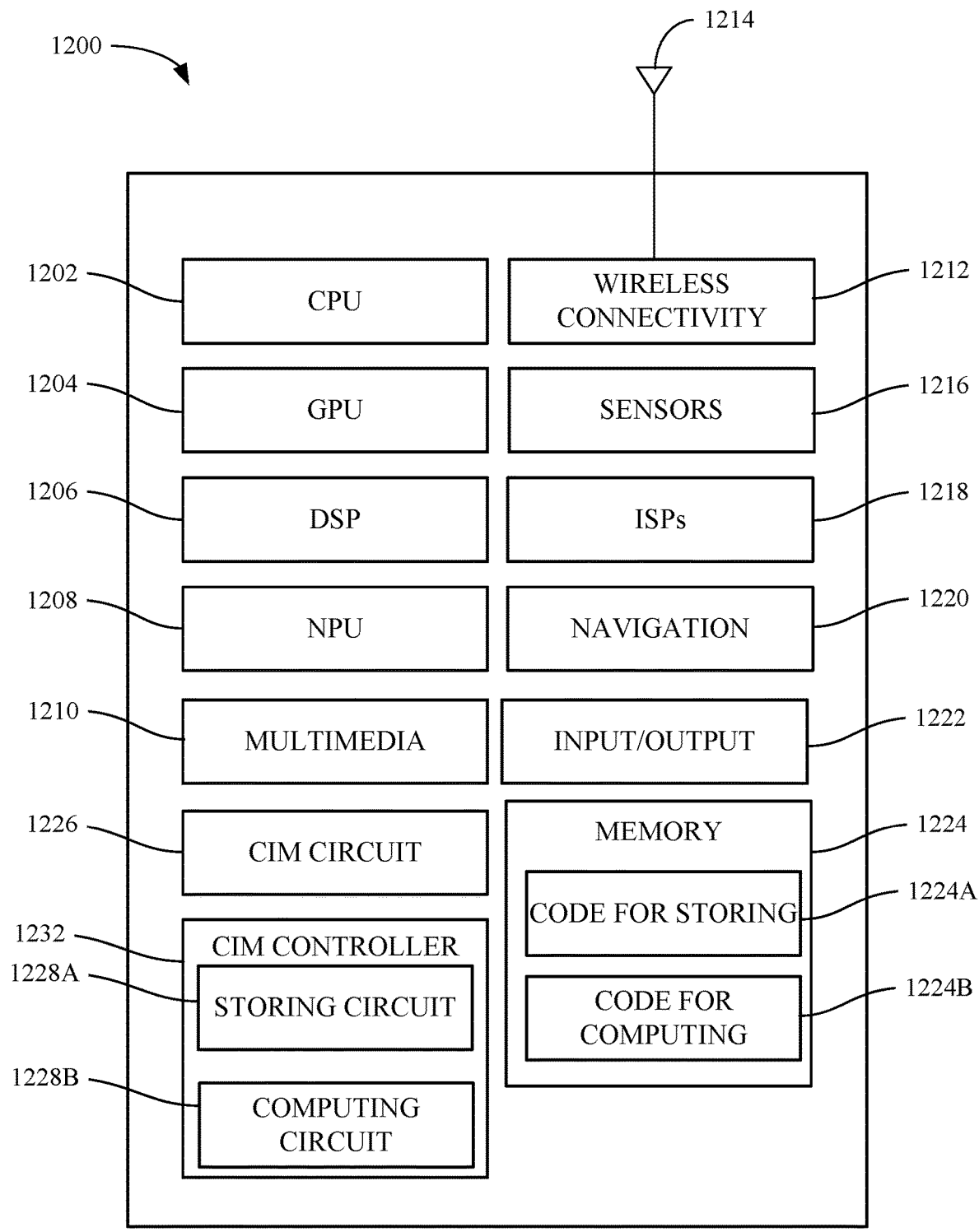
FIG. 12 illustrates an example electronic device configured to perform operations for signal processing in a neural network, in accordance with certain aspects of the present disclosure.

FIG. 12 illustrates an example electronic device 1200. Electronic device 1200 may be configured to perform the methods described herein, including operations 1100 described with respect to FIG. 11.

Electronic device 1200 includes a central processing unit (CPU) 1202, which in some aspects may be a multi-core CPU. Instructions executed at the CPU 1202 may be loaded, for example, from a program memory associated with the CPU 1202 or may be loaded from a memory 1224.

Electronic device 1200 also includes additional processing blocks tailored to specific functions, such as a graphics processing unit (GPU) 1204, a digital signal processor (DSP) 1206, a neural processing unit (NPU) 1208, a multimedia processing block 1210, a multimedia processing block 1210, and a wireless connectivity processing block 1212. In one implementation, NPU 1208 is implemented in one or more of CPU 1202, GPU 1204, and/or DSP 1206.

In some aspects, wireless connectivity processing block 1212 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and wireless data transmission standards. Wireless connectivity processing block 1212 is further connected to one or more antennas 1214 to facilitate wireless communication.

Electronic device 1200 may also include one or more sensor processors 1216 associated with any manner of sensor, one or more image signal processors (ISPs) 1218 associated with any manner of image sensor, and/or a navigation processor 1220, which may include satellite-based positioning system components (e.g., global positioning system (GPS) or global navigation satellite system (GLONASS)) as well as inertial positioning system components.

Electronic device 1200 may also include one or more input and/or output devices 1222, such as screens, touch-sensitive surfaces (including touch-sensitive displays), physical buttons, speakers, microphones, and the like. In some aspects, one or more of the processors of electronic device 1200 may be based on an advanced reduced instruction set computing (RISC) machine (ARM) instruction set.

Electronic device 1200 also includes memory 1224, which is representative of one or more static and/or dynamic memories, such as a dynamic random access memory, a flash-based static memory, and the like. In this example, memory 1224 includes computer-executable components, which may be executed by one or more of the aforementioned processors of electronic device 1200 or a CIM controller 1232 (also referred to as "control circuitry"). For example, the electronic device 1200 may include a CIM circuit 1226, such as the circuit 500, as described herein. The CIM circuit 1226 may controlled via the CIM controller 1232. For instance, in some aspects, memory 1224 may include code 1224A for storing (e.g., storing weights in memory cells), code 1224B for computing (e.g., performing a neural network computation by applying activation inputs). As illustrated, the CIM controller 1232 may include a circuit 1228A for storing (e.g., storing weights in memory cells), and a circuit 1228B for computing (e.g., performing a neural network computation by applying activation inputs). The depicted components, and others not depicted, may be configured to perform various aspects of the methods described herein.

In some aspects, such as where the electronic device 1200 is a server device, various aspects may be omitted from the example depicted in FIG. 12, such as one or more of the multimedia processing block 1210, wireless connectivity processing block 1212, antenna 1214, sensor processors 1216, ISPs 1218, or navigation processor 1220.

Example Clauses

Clause 1. A circuit for in-memory computation, comprising: a memory having multiple columns; a plurality of memory cells on each column of the memory, the plurality of memory cells being configured to store multiple bits representing weights of a neural network, wherein the plurality of memory cells on each of the multiple columns are on different word-lines of the memory; a plurality of digital counters, each digital counter of the plurality of digital counters being coupled to a respective column of the multiple columns of the memory; an adder circuit coupled to outputs of the plurality of digital counters; and an accumulator coupled to an output of the adder circuit.

Clause 2. The circuit of clause 1, further comprising a pulse generator having an input coupled to the respective column, wherein an output of the pulse generator is coupled to an input of the digital counter.

Clause 3. The circuit of any one of clauses 1-2, wherein the plurality of memory cells on each of the multiple columns are configured to generate digital output signals during multiple computation cycles, and wherein the digital counter is configured to count a quantity of logic highs of the digital output signals.

Clause 4. The circuit of any one of clauses 1-3, wherein the digital counter comprises a one's counter circuit.

Clause 5. The circuit of any one of clauses 1-4, wherein the digital counter comprises a set of flip-flops, wherein a clock input of a first flip-flop of the set of flip-flops is coupled to the column, and wherein an output of the first flip-flop is coupled to a clock input of a second flip-flop of the set of flip-flops.

Clause 6. The circuit of clause 5, wherein an output of each of the set of flip-flops provides a bit of a digital signal generated by the digital counter.

Clause 7. The circuit of any one of clauses 5-6, further comprising a half-latch circuit coupled to an output of a respective flip-flop of the set of flip-flops.

Clause 8. The circuit of any one of clauses 1-7, further comprising delay circuits, each delay circuit being coupled between the plurality of memory cells on the respective column of the multiple columns and a respective one of the plurality of digital counters.

Clause 9. The circuit of clause 8, wherein the delay circuits on the multiple columns have different delays.

Clause 10. The circuit of any one of clauses 1-9, further comprising: another plurality of memory cells on each of multiple other columns of the memory, the other plurality of memory cells being configured to store multiple bits representing weights of the neural network, wherein the other plurality of memory cells on each of the multiple other columns are on the different word-lines of the memory; another plurality of digital counters, each digital counter of the other plurality of digital counters being coupled to a respective column of the multiple other columns of the memory; and a multiplexer coupled to the outputs of the plurality of digital counters and outputs of the other plurality of digital counters.

Clause 11. The circuit of clause 10, wherein the multiplexer is configured to: provide output signals of the plurality of digital counters to the adder circuit during a first weight cycle; and provide output signals of the other plurality of digital counters to the adder circuit during a second weight cycle.

Clause 12. The circuit of any one of clauses 1-11, wherein the adder circuit comprises an adder tree configured to add output signals of the plurality of digital counters.

Clause 13. The circuit of clause 12, wherein one or more adders of the adder tree comprise a bit-shift-and-add circuit.

Clause 14. The circuit of any one of clauses 1-13, further comprising: a clock generator circuit having a first output configured to output a first clock signal and having a second output configured to output a second clock signal; and an activation circuit configured to provide activation signals to the plurality of memory cells, wherein: the activation circuit is coupled to the first output of the clock generator circuit and is configured to operate based on the first clock signal; and the adder circuit is coupled to the second output of the clock generator circuit and is configured to operate based on the second clock signal, the second clock signal having a different frequency than the first clock signal.

Clause 15. The circuit of clause 14, wherein the clock generator circuit comprises an edge-to-pulse converter configured to generate the first clock signal by generating a pulse based on detecting an edge of the second clock signal.

Clause 16. The circuit of clause 15, wherein the edge comprises a rising edge.

Clause 17. The circuit of any one of clauses 1-16, further comprising a sense amplifier coupled between the respective column and the digital counter.

Clause 18. The circuit of any one of clauses 1-17, wherein: the plurality of memory cells are configured to be sequentially activated based on different activation inputs; and the digital counter is configured to accumulate output signals from the plurality of memory cells after the plurality of memory cells are sequentially activated.

Clause 19. A method for in-memory computation, comprising: accumulating, via each digital counter of a plurality of digital counters, output signals on a respective column of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory; adding, via an adder circuit, output signals of the plurality of digital counters; and accumulating, via an accumulator, output signals of the adder circuit.

Clause 20. The method of clause 19, further comprising generating, via a pulse generator coupled to each column of the multiple columns, one or more pulses based on the output signals of the plurality of memory cells on the column, wherein accumulating the output signals via the digital counter is based on the one or more pulses.

Clause 21. The method of any one of clauses 19-20, further comprising counting, via the digital counter, a quantity of particular logic values of the output signals on the respective column of multiple columns.

Clause 22. The method of any one of clauses 19-21, further comprising generating, via the plurality of memory cells on each of the multiple columns, output signals during multiple computation cycles, wherein the digital counter is configured to count a quantity of logic highs of the digital output signals.

Clause 23. The method of any one of clauses 19-22, wherein the digital counter comprises a one's counter circuit.

Clause 24. The method of any one of clauses 19-23, wherein the digital counter comprises a set of flip-flops, wherein a clock input of a first flip-flop of the set of flip-flops is coupled to the column, and wherein an output of the first flip-flop is coupled to a clock input of a second flip-flop of the set of flip-flops.

Clause 25. The method of clause 24, further comprising generating, via each flip-flop of the set of flip-flops, a bit of the output signal generated by the digital counter.

Clause 26. The method of any one of clauses 24-25, further comprising latching, via a half-latch circuit, an output signal of each respective flip-flop of the set of flip-flops.

Clause 27. The method of any one of clauses 19-26, further comprising: applying a first delay to the output signals generated by the plurality of memory cells on a first column of the multiple columns; and applying a second delay to the output signals generated by the plurality of memory cells on a second column of the multiple columns.

Clause 28. The method of clause 27, wherein the first delay is different than the second delay.

Clause 29. The method of any one of clauses 19-28, further comprising: accumulating, via each digital counter of another plurality of digital counters, output signals on a respective column of multiple other columns of the memory, wherein another plurality of memory cells are on each of the multiple other columns, the other plurality of memory cells storing multiple bits representing weights of the neural network, wherein the other plurality of memory cells on each of the multiple other columns are on different word-lines of the memory; selecting, via a multiplexer, the output signals from the plurality of digital counters during a first weight cycle, the output signals being added via the adder circuit based on the selection of the output signals; selecting, via the multiplexer, other output signals from the other plurality of digital counters during a second weight cycle; and adding, via the adder circuit, the other output signals based on the selection of the other output signals.

Clause 30. An apparatus for in-memory computation, comprising: means for counting a quantity of particular logic values of output signals on a respective column of multiple columns of a memory, wherein a plurality of memory cells are on each of the multiple columns, the plurality of memory cells being configured to store multiple bits representing weights of a neural network, wherein the plurality of memory cells on each of the multiple columns are on different word-lines of the memory; means for adding output signals of the plurality of digital counters; and means for accumulating output signals of the means for adding.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, means for adding may include an adder tree, such as adder trees 510 or weight-shift adder tree 512, or an accumulator such as accumulators 606. Means for accumulating may include an accumulator such as the activation shift accumulator 516. Means for sensing may include an SA, such as the SAs 602.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A circuit for in-memory computation, comprising:
   a memory having multiple columns;
   a plurality of memory cells on each column of the memory, the plurality of memory cells being configured to store multiple bits representing weights of a neural network, wherein the plurality of memory cells of each of the multiple columns correspond to different word-lines of the memory;
   an activation circuit coupled to the different word-lines;
   a plurality of digital counters, each digital counter of the plurality of digital counters being coupled to a respective column of the multiple columns of the memory;
   an adder circuit coupled to outputs of the plurality of digital counters; an accumulator coupled to an output of the adder circuit; and
   a frequency converter configured to generate a first clock signal for the activation circuit based on a second clock signal for the adder circuit.

2. The circuit of claim 1, further comprising a pulse generator having an input coupled to the respective column, wherein an output of the pulse generator is coupled to an input of the digital counter for the respective column.

3. The circuit of claim 1, wherein the plurality of memory cells of each of the multiple columns are configured to generate digital output signals during multiple computation cycles, and wherein the digital counter for the respective column is configured to count a quantity of logic highs of the digital output signals.

4. The circuit of claim 1, wherein each digital counter of the plurality of digital counters comprises a one's counter circuit.

5. The circuit of claim 1, wherein each digital counter of the plurality of digital counters comprises a set of flip-flops, wherein a clock input of a first flip-flop of the set of flip-flops is coupled to the column, and wherein an output of the first flip-flop is coupled to a clock input of a second flip-flop of the set of flip-flops.

6. The circuit of claim 5, wherein an output of each of the set of flip-flops provides a bit of a digital signal generated by a respective digital counter of the plurality of digital counters.

7. The circuit of claim 5, further comprising a half-latch circuit coupled to an output of a respective flip-flop of the set of flip-flops.

8. The circuit of claim 1, further comprising delay circuits, each delay circuit being coupled between the plurality of memory cells of the respective column of the multiple columns and a respective one of the plurality of digital counters.

9. The circuit of claim 8, wherein the delay circuits of the multiple columns have different delays.

10. The circuit of claim 1, further comprising:
    another plurality of memory cells on each of multiple other columns of the memory, the other plurality of memory cells being configured to store multiple bits representing weights of the neural network, wherein the other plurality of memory cells of each of the multiple other columns correspond to the different word-lines of the memory;
    another plurality of digital counters, each digital counter of the other plurality of digital counters being coupled to a respective column of the multiple other columns of the memory; and
    a multiplexer coupled to the outputs of the plurality of digital counters and outputs of the other plurality of digital counters.

11. The circuit of claim 10, wherein the multiplexer is configured to:
    provide output signals of the plurality of digital counters to the adder circuit during a first weight cycle; and
    provide output signals of the other plurality of digital counters to the adder circuit during a second weight cycle.

12. The circuit of claim 1, wherein the adder circuit comprises an adder tree configured to add output signals of the plurality of digital counters.

13. The circuit of claim 12, wherein one or more adders of the adder tree comprise a bit-shift-and-add circuit.

14. The circuit of claim 1, further comprising:
    a clock generator circuit including the frequency converter and having a first output configured to output the first clock signal and having a second output configured to output the second clock signal, wherein:
    the activation circuit is configured to provide activation signals to the plurality of memory cells;
    the activation circuit is coupled to the first output of the clock generator circuit and is configured to operate based on the first clock signal; and the adder circuit is coupled to the second output of the clock generator circuit and is configured to operate based on the second clock signal, the second clock signal having a different frequency than the first clock signal.

15. The circuit of claim 14, wherein the frequency converter comprises an edge-to-pulse converter configured to generate the first clock signal by generating a pulse based on detecting an edge of the second clock signal.

16. The circuit of claim 15, wherein the edge comprises a rising edge.

17. The circuit of claim 1, further comprising a sense amplifier coupled between the respective column and the digital counter for the respective column.

18. The circuit of claim 1, wherein:
the plurality of memory cells are configured to be sequentially activated based on different activation inputs; and
each digital counter of the plurality of digital counters is configured to accumulate output signals from the plurality of memory cells after the plurality of memory cells are sequentially activated.

19. A method for in-memory computation, comprising:
providing, via an activation circuit, activation signals to different word-lines of a memory;
accumulating, via each digital counter of a plurality of digital counters, output signals on a respective column of multiple columns of the memory, wherein a plurality of memory cells are on each of the multiple columns, the plurality of memory cells storing multiple bits representing weights of a neural network, wherein the plurality of memory cells of each of the multiple columns correspond to the different word-lines of the memory;
adding, via an adder circuit, output signals of the plurality of digital counters;
accumulating, via an accumulator, output signals of the adder circuit; and
generating, via a frequency converter, a first clock signal for the activation circuit based on a second clock signal for the adder circuit.

20. The method of claim 19, further comprising generating, via a pulse generator coupled to each column of the multiple columns, one or more pulses based on the output signals of the plurality of memory cells of the column, wherein accumulating the output signals via the digital counter for the respective column is based on the one or more pulses.

21. The method of claim 19, further comprising counting, via the digital counter for the respective column, a quantity of particular logic values of the output signals on the respective column of multiple columns.

22. The method of claim 19, further comprising generating, via the plurality of memory cells of each of the multiple columns, the output signals on the respective column during multiple computation cycles, wherein the digital counter for the respective column is configured to count a quantity of logic highs of the output signals.

23. The method of claim 19, wherein each digital counter of the plurality of digital counters comprises a one's counter circuit.

24. The method of claim 19, wherein each digital counter of the plurality of digital counters comprises a set of flip-flops, wherein a clock input of a first flip-flop of the set of flip-flops is coupled to the column, and wherein an output of the first flip-flop is coupled to a clock input of a second flip-flop of the set of flip-flops.

25. The method of claim 24, further comprising generating, via each flip-flop of the set of flip-flops, a bit of the output signal generated by a respective digital counter of the plurality of digital counters.

26. The method of claim 24, further comprising latching, via a half-latch circuit, an output signal of each respective flip-flop of the set of flip-flops.

27. The method of claim 19, further comprising:
applying a first delay to the output signals generated by the plurality of memory cells of a first column of the multiple columns; and
applying a second delay to the output signals generated by the plurality of memory cells of a second column of the multiple columns.

28. The method of claim 27, wherein the first delay is different than the second delay.

29. The method of claim 19, further comprising:
accumulating, via each digital counter of another plurality of digital counters, output signals on a respective column of multiple other columns of the memory, wherein another plurality of memory cells are on each of the multiple other columns, the other plurality of memory cells storing multiple bits representing weights of the neural network, wherein the other plurality of memory cells of each of the multiple other columns correspond to different word-lines of the memory;
selecting, via a multiplexer, the output signals from the plurality of digital counters during a first weight cycle, the output signals being added via the adder circuit based on the selection of the output signals;
selecting, via the multiplexer, other output signals from the other plurality of digital counters during a second weight cycle; and
adding, via the adder circuit, the other output signals based on the selection of the other output signals.

30. An apparatus for in-memory computation, comprising:
means for providing activation signals to different word-lines of a memory;
means for counting a quantity of particular logic values of output signals on a respective column of multiple columns of a memory, wherein a plurality of memory cells are on each of the multiple columns, the plurality of memory cells being configured to store multiple bits representing weights of a neural network, wherein the plurality of memory cells of each of the multiple columns correspond to different word-lines of the memory;
means for adding output signals of the means for counting;
means for accumulating output signals of the means for adding; and
means for generating a first clock signal for the means for providing based on a second clock signal for the means for adding.

* * * * *